United States Patent
Ji et al.

(10) Patent No.: US 11,277,840 B2
(45) Date of Patent: Mar. 15, 2022

(54) METHOD AND APPARATUS FOR MULTI-BAND SINGLE CARRIER TRANSMISSION IN MILLIMETTER WIRELESS COMMUNICATION SYSTEM

(71) Applicant: Samsung Electronics Co., Ltd., Suwon-si (KR)

(72) Inventors: Hyoungju Ji, Suwon-si (KR); Taehyoung Kim, Suwon-si (KR); Heecheol Yang, Suwon-si (KR); Younsun Kim, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 16/789,310

(22) Filed: Feb. 12, 2020

(65) Prior Publication Data

US 2020/0260450 A1  Aug. 13, 2020

(30) Foreign Application Priority Data

Feb. 12, 2019  (KR) .................. 10-2019-0016370
May 16, 2019  (KR) .................. 10-2019-0057539

(51) Int. Cl.
*H04W 72/04* (2009.01)
*H04L 5/00* (2006.01)
*H04W 72/12* (2009.01)

(52) U.S. Cl.
CPC ....... *H04W 72/0453* (2013.01); *H04L 5/0048* (2013.01); *H04W 72/1278* (2013.01)

(58) Field of Classification Search
CPC .......... H04W 72/0453; H04W 72/1278; H04L 5/0048
See application file for complete search history.

(56) References Cited

U.S. PATENT DOCUMENTS 10,326,558 B2 *  6/2019  Lomayev .............. H04L 1/0057
10,411,940 B2    9/2019  Ko et al.
(Continued)

FOREIGN PATENT DOCUMENTS

WO   2018/126886 A1   7/2018
WO   2018/231010 A1   12/2018

OTHER PUBLICATIONS

International Search Report dated May 13, 2020 in connection with International Patent Application No. PCT/KR2020/001978, 4 pages.
(Continued)

*Primary Examiner* — Duc C Ho

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method, performed by a base station, includes identifying configuration information for single carrier signal transmission, transmitting the single carrier signal transmission configuration information to a terminal, transmitting control information scheduling data transmission, and transmitting data to the terminal using a single carrier according to the single carrier signal transmission configuration information and the control information. The single carrier signal transmission configuration information comprises at least one of offset or comb information indicating a resource to which the terminal can be scheduled, frequency resource information of a bandwidth part, or sub-carrier spacing information.

28 Claims, 27 Drawing Sheets

(56) References Cited

U.S. PATENT DOCUMENTS

| | | | |
|---|---|---|---|
| 2004/0218521 A1* | 11/2004 | Bolinth | H04L 27/02 370/206 |
| 2013/0039344 A1* | 2/2013 | Lee | H04W 76/10 370/331 |
| 2016/0087829 A1 | 3/2016 | Jia et al. | |
| 2017/0034812 A1 | 2/2017 | Deng et al. | |
| 2017/0295564 A1 | 10/2017 | Tiirola et al. | |
| 2018/0019848 A1 | 1/2018 | Lomayev et al. | |
| 2018/0092095 A1 | 3/2018 | Zeng et al. | |
| 2018/0123747 A1 | 5/2018 | Wang et al. | |
| 2019/0007152 A1* | 1/2019 | Yl | H04L 5/0028 |
| 2019/0021080 A1 | 1/2019 | Lei et al. | |
| 2019/0380098 A1 | 12/2019 | Liu et al. | |

OTHER PUBLICATIONS

Written Opinion of the International Searching Authority dated May 13, 2020 in connection with International Patent Application No. PCT/KR2020/001978, 5 pages.

Supplementary European Search Report dated Dec. 3, 2021 in connection with European Patent Application No. 20 75 5241, 10 pages.

* cited by examiner

FIG. 20A
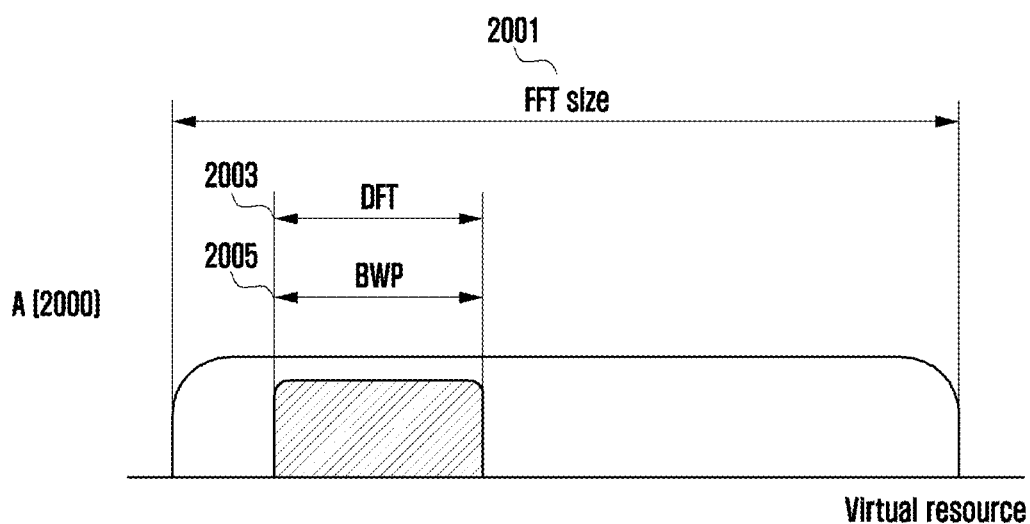
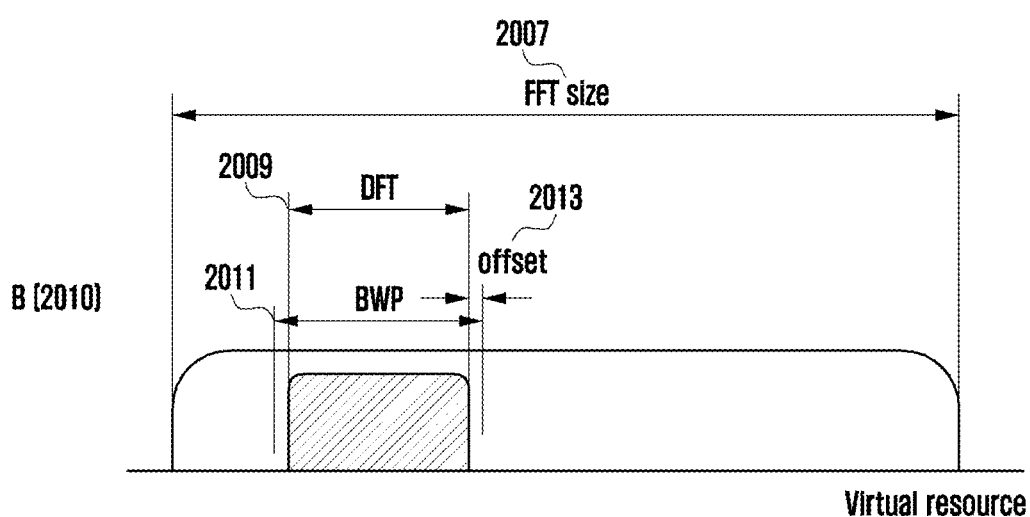

FIG. 20B
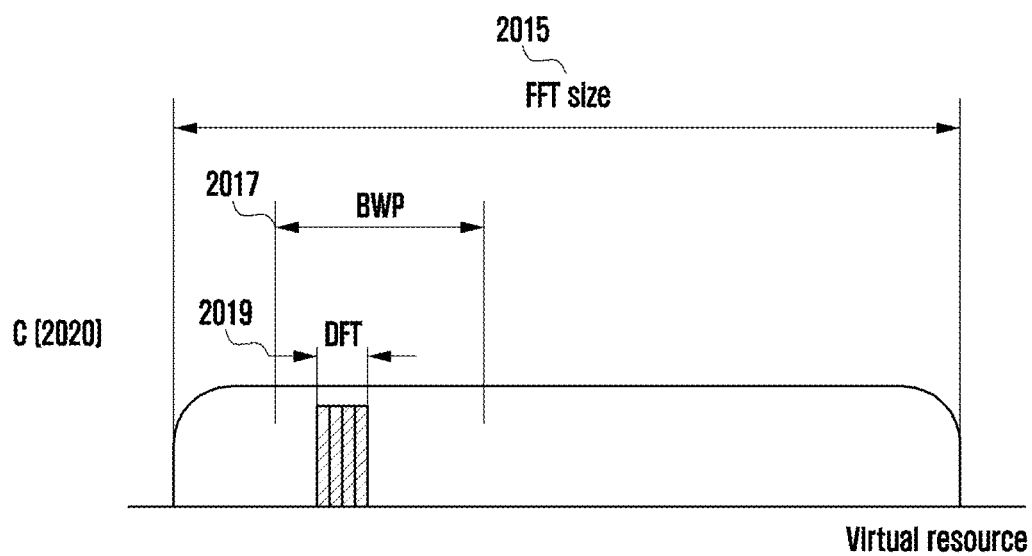
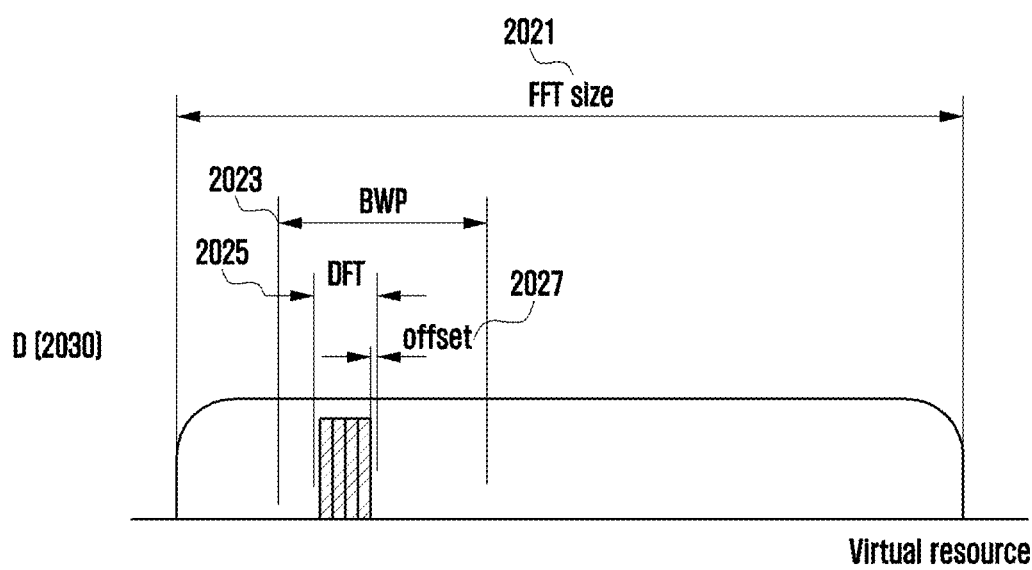

METHOD AND APPARATUS FOR MULTI-BAND SINGLE CARRIER TRANSMISSION IN MILLIMETTER WIRELESS COMMUNICATION SYSTEM

CROSS-REFERENCE TO RELATED APPLICATIONS

This application is based on and claims priority under 35 U.S.C. 119 to Korean Patent Application No. 10-2019-0016370 filed on Feb. 12, 2019 and Korean Patent Application No. 10-2019-0057539 filed on May 16, 2019 in the Korean Intellectual Property Office, the disclosures of which are herein incorporated by reference in their entireties.

BACKGROUND

1. Field

The embodiments of the disclosure relates to a communicating method and apparatus between a base station and a terminal in a millimeter wireless communication system and more particularly, to a method for a base station to multiplex multiple terminals to a single carrier while using multiple frequency bands. In addition, the embodiments of the disclosure are for the base station to perform a single carrier transmission while occupying a flexible frequency band.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

Generally, a mobile communication system has been developed for the purpose of providing communication while securing user mobility. Such a mobile communication system has reached a state capable of providing a high-speed data communication service as well as voice communication due to the rapid development of technology. Recently, as one of the next mobile communication systems, 3rd generation partnership project (3GPP) is working on the specification of new radio (NR) system. The NR system is being developed to meet a variety of network requirements and to achieve a wide range of performance targets. Especially, the NR system is a technology for implementing communication in a millimeter wave band (6 GHz to 100 GHz).

Hereinafter, the NR system may be understood to include a 5G NR system supporting a microwave, a 4G LTE system, and an LTE-A system, including millimeter wave band communication in a band of 6 GHz or more. The NR system may be mixed with a $5^{th}$ generation (5G) communication system. From these, NR frequency range (FR)1 system is a 5G system supporting 6 GHz or less, NR FR2 system is a 5G system supporting 6 GHz or more and 60 GHz or less, and an NR FR3 system is 60 GHz or more and 100 GHz or less. The embodiments of the disclosure described below can be applied primarily for NR FR3 but also for other systems.

The above information is presented as background information only to assist with an understanding of the disclosure. No determination has been made, and no assertion is made, as to whether any of the above might be applicable as prior art with regard to the disclosure.

SUMMARY

In millimeter-wave (mmWave) bands of 6 GHz or higher where the NR systems can be supported, high power signal transmission is needed to reinforce high path loss and signal attenuation between a base station and a terminal. In this case, since it is difficult to use a multi-carrier transmission technology, the disclosure proposes a method and an apparatus for efficiently supporting user multiplexing using a single carrier in the millimeter wave band and transmitting and receiving a signal.

A method for transmitting a plurality of terminals in different frequency bands with a single carrier according to the disclosure includes at least one of: determining a preferred frequency band for each user; determining the ratio of samples occupied by a plurality of terminals in one symbol; determining a location occupied by a sample of a data channel transmitted to a plurality of terminals in one symbol; determining a power of a sample occupied by a plurality of terminals in one symbol; determining a single carrier occupied bandwidth, based on an allowable bandwidth of the terminal; configuring one or more single carrier occupied bandwidths, based on the allowable bandwidth of the terminal and indicating the one or more terminals; interleaving resources available to each terminal to occupy orthogonal times in single carrier transmission by terminals occupying different frequency bands in one base station; interleaving resources to which a signal for each terminal can be transmitted in order to reduce interference when the terminals occupying the same frequency band in one or more base stations perform single carrier transmission; exchanging information with a terminal or/and a neighboring base station so that terminals occupying overlapping frequency bands in one or more base stations transmit signals without interference when performing communication using different sub-carrier intervals; multiplexing a reference signal supporting one or more in one symbol to maintain a single carrier, including at least a reference signal, a control signal, and a data signal in one symbol to reduce transmission delay; and configuring one or more single carrier bands in one symbol to transmit one or more beams and so that symbols do not overlap.

In addition, a signal transmission method of a base station of a wireless communication system includes: identifying configuration information for single carrier signal transmission; transmitting the single carrier transmission configuration information to a terminal; transmitting control information scheduling data transmission; and transmitting data to the terminal using single carrier according to the single carrier transmission configuration information and the control information, wherein the single carrier transmission configuration information includes at least one of offset or comb information indicating a resource to which the terminal can be scheduled, frequency resource information of a bandwidth part, and sub-carrier spacing information.

In addition, a signal reception method of a base station of a wireless communication system includes: receiving configuration information for single carrier signal transmission from a base station; receiving control information scheduling data transmission; and receiving data from the base station using single carrier according to the single carrier transmission configuration information and the control information, wherein the single carrier transmission configuration information includes at least one of offset or comb information indicating a resource to which the terminal can be scheduled, frequency resource information of a bandwidth part, and sub-carrier spacing information.

In addition, a base station of a wireless communication system includes: a transceiver; and a controller connected to the transceiver and configured to identify configuration information for single carrier signal transmission, transmit the single carrier transmission configuration information to a terminal, transmit control information scheduling data transmission, and transmit data to the terminal using single carrier according to the single carrier transmission configuration information and the control information, wherein the single carrier transmission configuration information includes at least one of offset or comb information indicating a resource to which the terminal can be scheduled, frequency resource information of a bandwidth part, and sub-carrier spacing information.

In addition, a terminal of a wireless communication system includes: a transceiver; and a controller for controlling to receive configuration information for single carrier signal transmission from a base station, receive control information scheduling data transmission, and receive data from the base station using single carrier according to the single carrier transmission configuration information and the control information, wherein the single carrier transmission configuration information includes at least one of offset or comb information indicating a resource to which the terminal can be scheduled, frequency resource information of a bandwidth part, and sub-carrier spacing information.

According to the embodiments of the disclosure, a base station can simultaneously support terminals occupying different frequency bands using a single carrier for one symbol. In addition, the terminal can receive signals between users using the same beam without interference, or can receive signals from adjacent cells using the same bandwidth without interference, thereby increasing reliability of data transmission.

According to the embodiments of the disclosure, the base station can effectively transmit signals to a plurality of terminals via a single carrier, and also improve system performance by transmitting signals via a preferred frequency band for each terminal. In addition, according to the embodiments of the disclosure, the base station can maintain coverage by transmitting a single carrier signal to each terminal in frequency bands preferred by one or more terminals using the same analog beam. In addition, according to the embodiments of the disclosure, the base station can configure or adjust the time domain of a sample occupied by a terminal on one symbol in advance, and can transmit signals so that the samples of each terminal do not overlap in the time domain between the terminals. In addition, according to the embodiments of the disclosure, the base station can support single carrier transmission regardless of the maximum allowable frequency band of the terminal and the size of the frequency domain of the data channel actually transmitted.

In addition, according to the embodiments of the disclosure, the base station can configure one or more candidates for a single carrier transmission bandwidth in the terminal in advance and perform data scheduling so that the base station can change the same dynamically or semi-dynamically. In addition, according to the embodiments of the disclosure, the base station can adjust the power density transmitted to the terminal in consideration of a frequency band allocated by the terminal or a sample occupancy time in a symbol regardless of the frequency band. In addition, according to an embodiment of the disclosure, the base station can be configured so that samples for data channels transmitted to one or more terminals are distributed in a symbol but transmitted so as not to overlap with samples for data channels of other terminals.

In addition, according to the embodiments of the disclosure, when one or more base stations occupy the same frequency band and transmit signals simultaneously, the interference may be randomized such that only some of the overlapping samples (on the time axis) exist between the terminals scheduled by the respective base stations. In addition, according to the embodiment of the disclosure, when one or more base stations using different sub-carrier intervals occupy the same frequency band and transmit signals, the base stations can transmit signals without interference. In addition, according to an embodiment of the disclosure, in order to transmit a reference signal for supporting one or more terminals occupying different frequency bands, the base station can use the offset of the virtual resource index differently in the frequency bands used by each terminal to prevent interference from occurring.

In addition, according to the embodiment of the disclosure, the base station can perform reference signal transmission for supporting one or more terminals occupying different frequency bands. In addition, according to an embodiment of the disclosure, the base station can multiplex and transmit at least one of a reference signal, a control channel and a data channel to one symbol for one or more terminals occupying different frequency bands. In addition, one base station according to an embodiment of the disclosure can transmit signals using different samples in one or more bands using different analog beams in one symbol.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 20A is a view illustrating a single carrier frequency band configuration method proposed by the disclosure;

FIG. 20B is a view illustrating another single carrier frequency band configuration method proposed by the disclosure;

DETAILED DESCRIPTION

Figure 1:
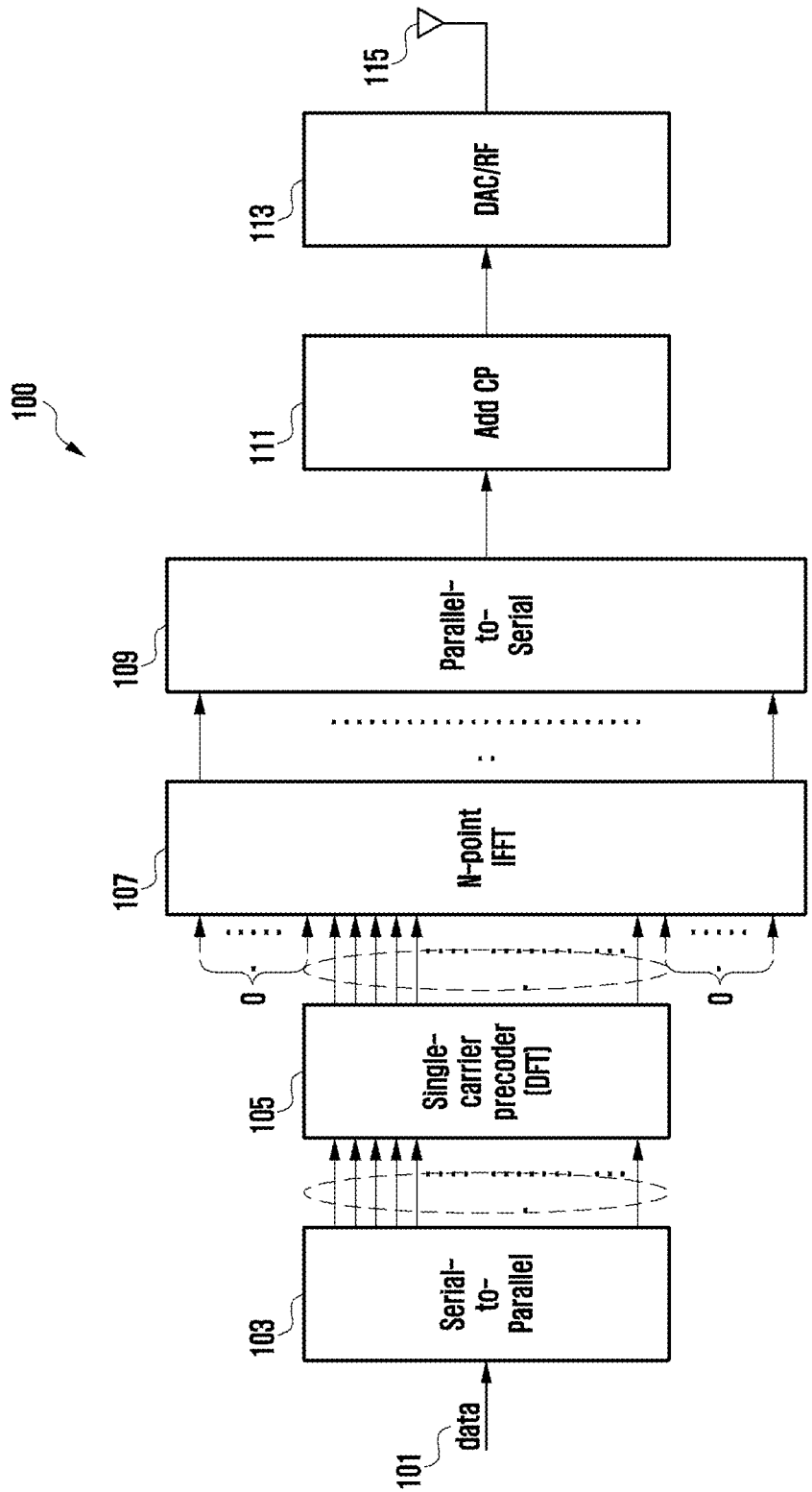
FIG. 1 is a view illustrating a communication system transmitting and receiving data between a base station and a terminal.

Hereinafter, embodiments of the disclosure will be described in detail with reference to the accompanying drawings.

In describing the embodiments, descriptions of technical contents that are well known in the technical field to which the embodiments of the disclosure belong and are not directly related to the embodiments of the disclosure will be omitted. This omission of the unnecessary description is intended to prevent the main idea of the disclosure from being unclear and more clearly transfer the main idea.

For the same reason, in the accompanying drawings, some elements may be exaggerated, omitted, or schematically illustrated. Further, the size of each element does not entirely reflect the actual size. In each figure, the same or corresponding components are given the same reference numerals.

The advantages and features of the disclosure and methods of achieving the same will be apparent by referring to embodiments of the disclosure as described below in detail in conjunction with the accompanying drawings. However, the disclosure is not limited to the embodiments invented below but may be embodied in various forms, and only the embodiments are provided to make the disclosure complete and those skilled in the art to which the disclosure pertains. It is provided to fully inform the scope of the disclosure, and the disclosure is defined only by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term '~part' used in the embodiments refers to software or a hardware component such as a field programmable gate array (FPGA) or an application specific integrated circuit (ASIC), and '~part' plays a role. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, "~unit" may include one or more processors.

An embodiment of the disclosure is for a communication system for transmitting a downlink signal from a base station to a terminal in an NR system. The downlink signal of the NR includes a data channel through which information is transmitted, a control channel through which control information is transmitted, and a reference signal (RS) for channel measurement and channel feedback.

The NR base station may transmit data information and control information to a terminal via a physical downlink shared channel (PDSCH) and a physical downlink control channel (PDCCH), respectively. The PDSCH is a downlink data transmission channel of a physical layer and the PDCCH is a downlink control information transmission channel of a physical layer. Hereinafter, PDSCH transmission and reception may be understood as data transmission and reception on the PDSCH, and PDCCH transmission and reception may be understood as transmission and reception of control information on the PDCCH.

The NR base station may have a plurality of reference signals, and the plurality of reference signals may include at least one of channel state information RS (CSI-RS) and a demodulation reference signal or a terminal dedicated reference signal (DMRS). The NR base station transmits a terminal-specific reference signal (DMRS) only to an area scheduled to transmit data, and transmits a CSI-RS on a time and frequency axis to acquire channel information for data transmission. The reference signal described below may include both types of reference signals.

Hereinafter, the base station, which is a subject performing resource allocation of a terminal, may be at least one of gNode B(gNB), eNode B(eNB), Node B, base station (BS), radio access unit, base station controller, or a node on a network. In addition, the base station may be mixed with a transmission and reception point (TxRP or TRP). The terminal may include a user equipment (UE), a mobile station (MS), a cellular phone, a smart phone, a computer, or a multimedia system capable of performing communication. In addition, in the following, higher signaling (or high layer signaling) may mean a medium access control element (MAC CE) or radio resource control (RRC) signaling (this may include a master information block (MIB) or a system information block (SIB)) rather than physical layer signaling. In addition, the physical layer signaling may mean being included in downlink control information and transmitted on the PDCCH.

In a wireless communication system, communication between a base station and a terminal is closely affected by a radio wave environment. Especially, in the 60 MHz band or higher, the signal attenuation due to moisture and oxygen in the air is very large and the signal transmission is very difficult due to the small scattering effect due to the small wavelength. Accordingly, the base station has to transmit signals at higher powers to achieve similar cell coverage as base stations using frequency bands below 60 MHz, and the multicarrier transmission technique, which has shown excellent performance in overcoming multipath delay effects in 4G systems when transmitting signals at higher transmit powers, is difficult to use due to high peak to average power ratio (PAPR). In the case of multi-carrier, a large number of dynamic change in time symbols uses a back-off that configured a low transmit power to maintain a linear area of a transmit power amplifier. Therefore, in a frequency band using high power to overcome path attenuation, signal transmission using a single carrier is more suitable than multiple carriers.

However, when performing single carrier transmission to use higher transmission power, user multiplexing is difficult and channel estimation performance and channel estimation performance of a multipath signal is degraded. In addition, in the millimeter wave, in order to overcome a high path loss, it may be mixed with an analog beam (hereinafter, referred to as a beam) and may be understood as a directional signal in this specification. The transmission beam in the disclosure may be understood as a signal to which a spatial domain transmission filter is applied, and the reception beam may be understood as a signal to which a spatial domain reception filter is applied. The beam in the disclosure may be understood as a signal to which analog beamforming or/and digital beamforming is/are applied. The length of the millimeter wave's wavelength is very short, thus the bandwidth of the analog beam is reduced, which makes multi-user support even more difficult. Therefore, for a system using millimeter wave, it is difficult to guarantee the system performance to a level of technology used in the microwave band.

Accordingly, the disclosure proposes a method and an apparatus for effectively supporting a user multiplexing using a single carrier in the millimeter wave band. In particular, the base station operates one single carrier and uses a different frequency band for each user.

FIG. 1 is a view illustrating a communication system transmitting and receiving data between a base station and a terminal.

Referring to FIG. 1, a transmitter 100 is a system capable of orthogonal frequency division multiplexing (OFDM) transmission and may transmit a single carrier (SC) in a bandwidth capable of OFDM transmission. The transmitter 100 may include a serial-to-parallel (S-P) converter 103, a single-carrier preprocessor 105, an inversion fast Fourier transform (IFFT) unit 107, a parallel-to serial (P-S) converter 109, a cyclic prefix (CP) inserter 111, an analog signal unit 113 (this may include a digital-to-analog converter and an RF), and an antenna module 115.

Data 101 of size M (data sequence of size M in vector), which has been subjected to channel coding and modulation, is converted into a parallel signal in the serial-to-parallel converter 103 and then to an SC waveform (hereinafter, referred to as SCW) by the SC preprocessor 105. The apparatus for converting parallel signals into SCW may be implemented in a variety of ways, including using a discrete Fourier transform (DFT) preprocessor, up-converting, code-spreading, and the like. The disclosure may include various preprocessing methods, and for the sake of understanding, the following description will be made based on the SCW generation method using DFT preprocessor. However, embodiments of the disclosure may be equally used when generating the SCW by other methods.

Here, the size of the DFT is equal to M and the data signal passing through the DFT preprocessor (or DFT filter) of length M is converted into a wideband frequency signal through an N-point IFFT 107 processor. The N-point IFFT processor processes the signal on each sub-carrier of the transmitting channel bandwidth divided into N sub-carriers. However, since the DFT preprocessing of length M was performed before the N-point IFFT processor, the signal transmitted after the IFFT is transmitted using one single carrier, based on the center carrier of the bandwidth to which the signal after the length M DFT preprocessing is mapped. The data processed in the N-point IFFT 107 is stored as N samples through the process of the parallel-serial processor 109, where some of the later samples are copied and concatenated behind the N samples. This process is performed in the CP insertion unit 111.

Thereafter, the signal is transmitted to the analog signal unit 113 through a pulse shaping filter, such as a raised cosine filter, is converted into an analog signal through a digital-to-analog conversion process such an amplifier (power amplifier (PA)), is delivered to the antennal module 115 and radiated to the atmosphere.

A general SCW signal is mapped to M preprocessed signals to desired M consecutive sub-carriers as shown in 107 of FIG. 1. Therefore, the size of M is determined according to the size of the transmitted data or the amount of time symbols used by the transmitted data. The size of M is generally much smaller than the N because the characteristic of the SCW is a signal with a small peak-to-average-power ratio (PAPR).

The PAPR means the size of the change in transmission power of a sample of the transmitted signal. A large PAPR means a large dynamic range of the transmitter's PA, which means that a power margin used to operate the PA is large. In this case, the transmitter configures a higher margin of available PA in preparation for the possibility of a large change in transmit power, thus reducing the maximum strategy available to the transmitter, which in turn reduces the maximum possible communication distance between the transmitter and the receiver. On the other hand, in the case of the SCW with small PAPR, the change of PA id very small, so even if margin is configured to be small, the operation of PA is possible and thus the maximum communication distance increases.

In the case of the millimeter wave wireless communication system, it is important to maintain the communication distance because the radio wave attenuation is high. Therefore, it is advantageous for the base station to use a technique for increasing the maximum communication distance such as SCW. In general, since the SCW has a smaller PAPR than the multi-carrier waveform (MCW) and thus has a margin of 5~6 dB higher, which allows transmitters to use higher maximum transmit power than MCW transmitter, resulting in increased maximum communication distance. The SCW as shown in FIG. 1 is generally used in a terminal having a lower maximum transmission power, such as uplink, and is particularly used for uplink transmission of an LTE system. In particular, since the terminal lacks the power of uplink transmission, the terminal cannot configure the size of M largely, and the communication distance can be maintained by reducing M as the transmission power is insufficient.

In addition, since the base station receives a signal transmitted by one terminal, uplink does not need to consider a case in which one or more terminals transmit a signal using the same single carrier. On the other hand, in the case of the millimeter wave wireless system, power shortage occurs in the downlink due to radio wave attenuation. In the case of downlink transmission, support for this is necessary because simultaneous signal transmission for one or more terminals of the base station is necessary.

Figure 2:
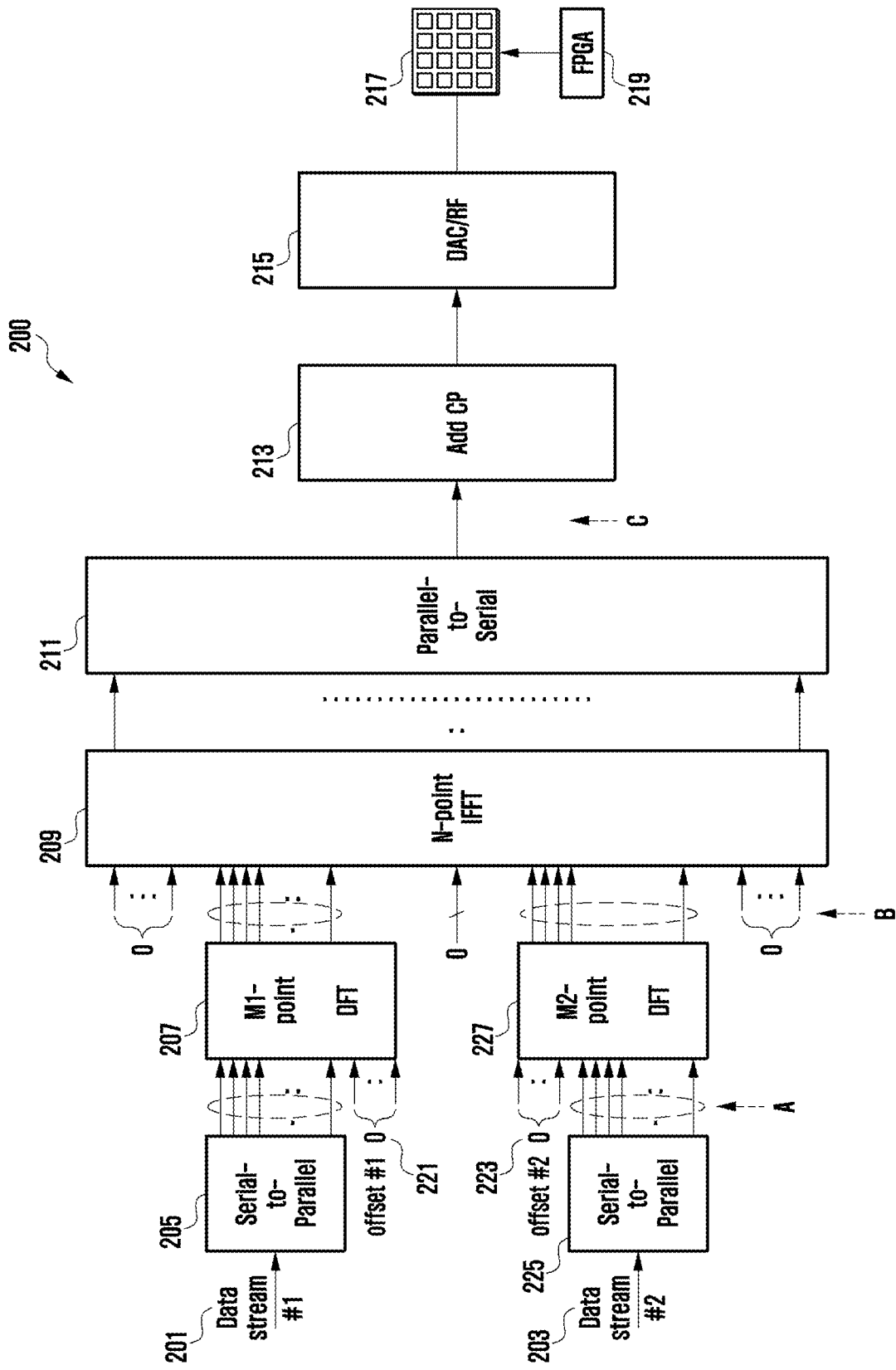
FIG. 2 is a view of an apparatus illustrating an example of a downlink multi-band single carrier transmission method proposed by the disclosure.

FIG. 2 is a view of an apparatus illustrating an example of a downlink multi-band single carrier transmission method 200 proposed by the disclosure.

Referring to FIG. 2, the multi-band single carrier transmission method proposed by the disclosure is a method to compensate for the difficulty in frequency selective transmission of the conventional single carrier transmission method. Data transmitted to one or more terminals is transmitted via a preferred frequency band, where the signal transmitted to the terminal can be transmitted in the same waveform as a single carrier transmission to secure coverage. To this end, the proposed method is as follows.

When the base station transmits two different data streams, such as 201 and 203, first, each data stream 201 and 203 passes through the serial-to-parallel converter 205 and 225, respectively, and then mapped into a M1 sized DFT preprocessor 207 and a M2 sized DFT preprocessor 227, respectively, to fit the bandwidth occupied by each. At this time, the sample area should be determined by applying the offset #1 221 and the offset #2 223 so that the data stream #1 201 and the data stream #2 203 do not overlap each other in the time sample after passing through the parallel-to-serial converter 211. The size of the virtual resource (or the size of the virtual resource can be understood as a ratio of the virtual resource) for transmitting data stream #1 201 is M1/(M1+M2) when the size of the DFT is M1 and the size of the virtual resource for transmitting data stream #2 203 is M2/(M1+M2) when the size of the DFT is M2. If M1 and M2 have the same size, data stream #1 201 and data stream #2 203 each occupy half of the virtual resource. After passing through the parallel-to-serial converter 211, the data streams pass through the CP insertion unit 213, transmitted to the analog signal unit 215, and the data streams are transmitted from the antenna panel 217 connected with the FPGA 219.

If this is generalized, it is as follows. When the ML size DFT preprocessing is applied to each of the L data streams, the length Pl of the virtual resource occupied by the l-th terminal is expressed by Equation 1 below.

$$P_l = M_l/(M_1+M_2+\ldots+M_L) \qquad \text{Equation 1}$$

Here, generation of a data channel using DFT-s-OFDM (DFT-spread-OFDM) can be expressed as follows.

If xx (0), . . . , xx ($M_{sc}^{PDSCH}$-1) are called data symbols to be transmitted in one OFDM symbol, and x (0), . . . , x ($P_l$-1) are modulated symbols to be transmitted in one OFDM symbol, xx may be expressed as follows for each terminal. In the following equations, the former is applied when the modulation symbol is mapped to the DFT preprocessor, when the offset is applied to the low index portion, or when the offset shift occurs at the beginning of the xx symbol (offset #2 223 in FIG. 2), and the latter expression is used when the modulation symbol is mapped to the DFT preprocessor, when the offset is applied to the high index portion or when the shift by the offset occurs at the end of the xx symbols (offset #1 221 in FIG. 2).

$$xx(\text{offset}), \ldots, xx(P_l-1+\text{offset}) = x(0), \ldots, x(P_l-1), \text{ or}$$

$$xx(M_{sc}^{PDSCH}-1-\text{offset}-P_l), \ldots, xx(M_{sc}^{PDSCH}-1-\text{offset}) = x(0), \ldots, x(P_l)$$

The frequency band symbol y converted to SC by DFT-S-OFDM (that is, by the DFT preprocessor) may be expressed by Equation 2 as follows.

$$y(l \cdot M_{sc}^{PDSCH} + k) = \frac{1}{\sqrt{M_{sc}^{PDSCH}}} \sum_{i=0}^{M_{sc}^{PDSCH}-1} xx(l \cdot M_{sc}^{PDSCH} + i)e^{-j\frac{2\pi ik}{M_{sc}^{PDSCH}}} \qquad \text{Equation 2}$$

$$k = 0, \ldots, M_{sc}^{PDSCH} - 1$$

$$l = 0, \ldots, L-1$$

Here, $M_{sc}^{P\ DSCH} = M_{RB}^{P\ DSCH} N_{sc}^{RB}$ represents the size of a resource occupied by the PDSCH in PRB units and is equal to the length of bandwidth occupied by a single carrier. I means symbol index. Here, $M_{sc}^{P\ DSCH} \geq P_l$, and $M_{sc}^{P\ DSCH} - P_l = $ offset. The disclosure is applicable to all equations that produce the same y including the method described above.

The size of the offset may be a predetermined value according to the above-described rule, and this value may be indicated by higher signaling. For example, when mapping modulation symbols to successive symbols, information of whether an offset shift occurs at the beginning or the end of the xx symbol may be previously indicated by higher signaling or may be indicated via a control channel such as a PDCCH.

The method of using the offset includes not only a method of using a continuous offset as described, but also a method of configuring a random offset and a method of using offsets separated by equal intervals. In the case where the symbols used for data transmission are separated at consecutive equal intervals using offsets, the terminal may be indicated by the base station about the location of the interval used for receiving each data channel and information on the interval used for resource allocation. For example, if two users receive a signal using a single carrier transformed through a DFT of M1=M2=M, the base station may configure the interval used for resource allocation, for example, to 2 and configure the location used for reception of each data channel to 0 or 1, to transmit the same to each terminal. For example, if the interval is 2, two configurations of M virtual resources with indexes 0, 2, 4, . . . , M−2, and 1, 2, 3, . . . , M−1 can be configured. If the base station indicates that user 1 indicates location 0 and user 2 indicates location 1, the symbol for user 1 is mapped to an index of 0, 2, 4, . . . , M−2 in the virtual resource index, and user 2 is mapped to an index of 1, 3, 5, . . . , M−1 in the virtual resource index so that the base station can transmit a signal while maintaining the characteristics of a single carrier.

Even when the DFT sizes M1 and M2 are different, the symbols for each terminal may use virtual resources that do not overlap each other by calculating the intervals of time samples. For example, when M1=2M2, the length of the consecutive allocation resource of the terminal through which the signal is transmitted using DFT size M1 (hereinafter, referred to as terminal 1) may be configured to twice the length of the allocation resource of the terminal through which the signal is transmitted using the DFT size M2 (hereinafter, referred to as terminal 2). For example, when M1=4 and M2=2, the terminal 1 may use two consecutive resources, and the terminal 2 may use one consecutive resource. When, terminal 1 uses resource interval 0, then terminal 1 occupies the first (two) virtual resources and terminal 2 uses resource interval 1 so that terminal 2 occupies the second virtual resource. That is, the amount of the first virtual resource occupied by terminal 1 and the amount of the second virtual resource occupied by terminal 2 are equal. The first virtual resource is divided into two virtual resources so that 2n symbols of terminal 1 are assigned to the first virtual resource, and the n symbols of terminal 2 are mapped to the second virtual resource. In this case, since the time in the time symbol of the terminal 1 corresponding to the first (two) virtual resources does not overlap with the time of the terminal 2 in the time symbol corresponding to the second resource, a single carrier can be maintained.

Figure 3:
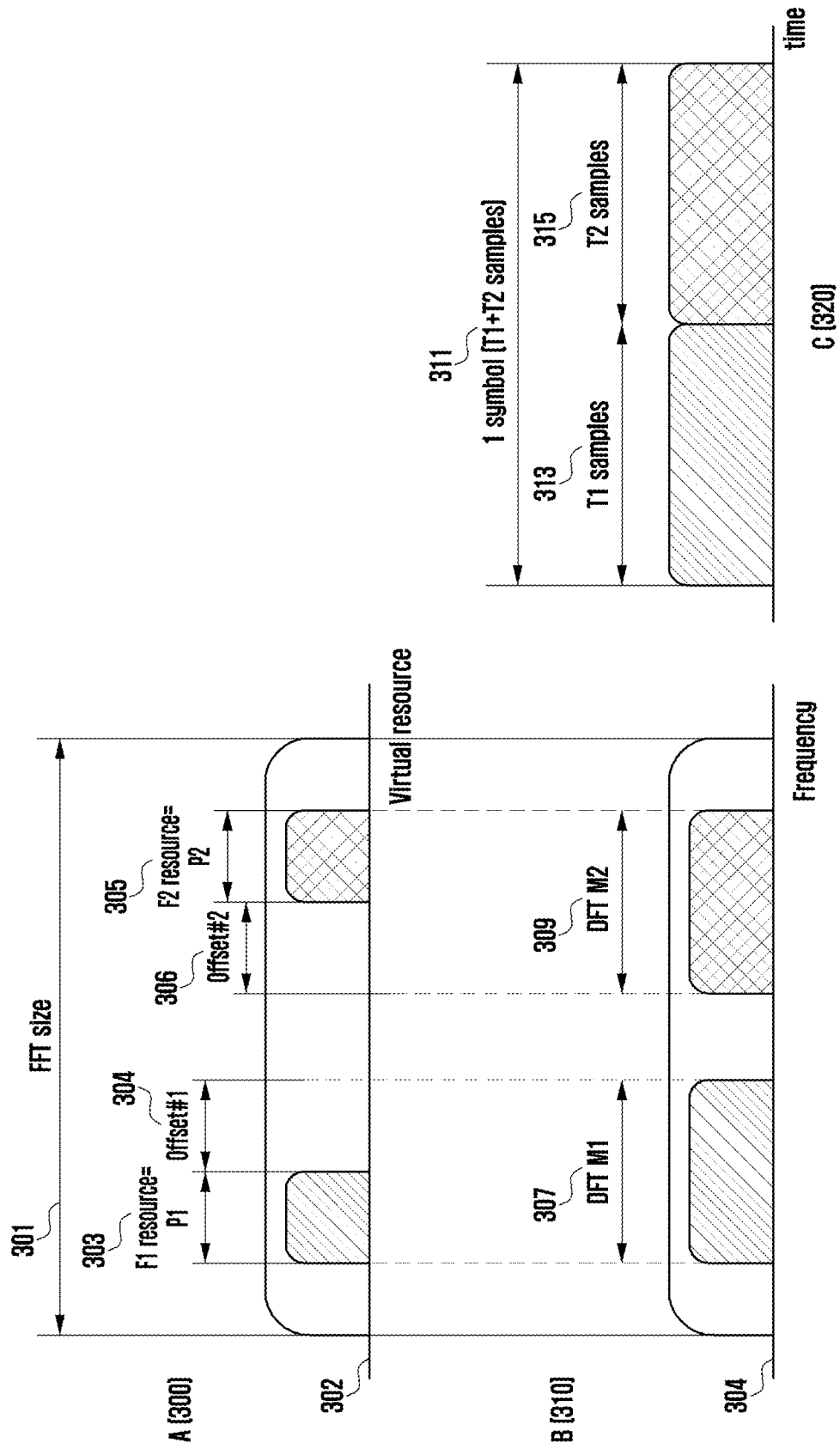
FIG. 3 is a view illustrating a method for allocating time and frequency resources according to a multi-band single carrier transmission method proposed by the disclosure.

FIG. 3 is a view illustrating a method for allocating time and frequency resources according to a multi-band single carrier transmission method proposed by the disclosure.

Referring to FIG. 3, reference numeral A 300 denotes a virtual resource input to the DFT preprocessors 207 and 227 in FIG. 2, reference numeral B 310 denotes a frequency band symbol which is N-point IFFT 209 processed after DFT preprocessing in FIG. 2, and reference numeral C 320 denotes a sample of a time symbol after parallel-to-serial conversion 211 in FIG. 2. Reference numeral 301 is a channel bandwidth operated by a cell accessed by the terminal, which may be referred to as an FFT size used by the terminal. In FIG. 3, the axis 302 denotes the virtual resource area in terms of resource elements (REs). RE refers to a resource corresponding to one OFDM symbol in the time axis and one sub-carrier area in the frequency axis. Reference numeral 303 denotes a data symbol x of UE #1 mapped to the virtual resource, and reference numeral 305 denotes a data symbol x of UE #2 mapped to the virtual resource. Data transmitted to UE #1 is mapped to consecutive $P_l$ virtual resources such as 303, and offset #1 304, which is a difference from DFT size M1 307, is configured to null or zero. Similarly, it can be seen that data transmitted to UE #2 is configured to NULL or 0 by a consecutive offset #2 306 on a virtual resource and mapped to the remaining $P_2$ pieces as shown in 305. At this time, the sum of the offset #2 306 and the $P_2$ 305 becomes the DFT size M2 309.

When the resource area Pi and offset #i area are configured as the ratio of M1 and M2, when the OFDM symbol 311 is viewed in units of samples, the samples transmitted to the terminal #1 occupy the time area 313 of T1. The sample transmitted to the terminal #2 occupy the time area 315 of T2. As a result, a signal for one or more terminals are transmitted to one OFDM symbol and at the same time, the base station can transmit a signal using a frequency band preferred by each terminal. In addition, since the signals of one or more terminals do not overlap each other in a time sample, an increase in PAPR does not occur, and thus, both terminals may be supported using one symbol. The embodiments described in the disclosure are the cases of two terminals, but this method can be universally applied to N terminals.

In addition, the method proposed above may be applied to a case where one terminal uses more than one single carrier band. By replacing the above-described data transmitted to UE #1 and data transmitted to UE #2 with a codeword of a data channel transmitted by one terminal, the base station transmits CW #1 and CW #2 for one terminal, for example, the base station may transmit the same data, such as CW #1 and CW #1 to one terminal by using each single carrier band, or the base station can transmit data RV1 and RV2 according to a different redundancy version (RV) of the data channel to one terminal. Although FIG. 3 illustrates an example of using two single carrier bands, this data transmission method may be applied to the case of using any number of single carrier bands. The transmission for the user 1 and the user 2 (or the terminal 1 and the terminal 2) described later may also be interpreted as an example of transmitting the same data signal or different data signals for one user.

Figure 4:
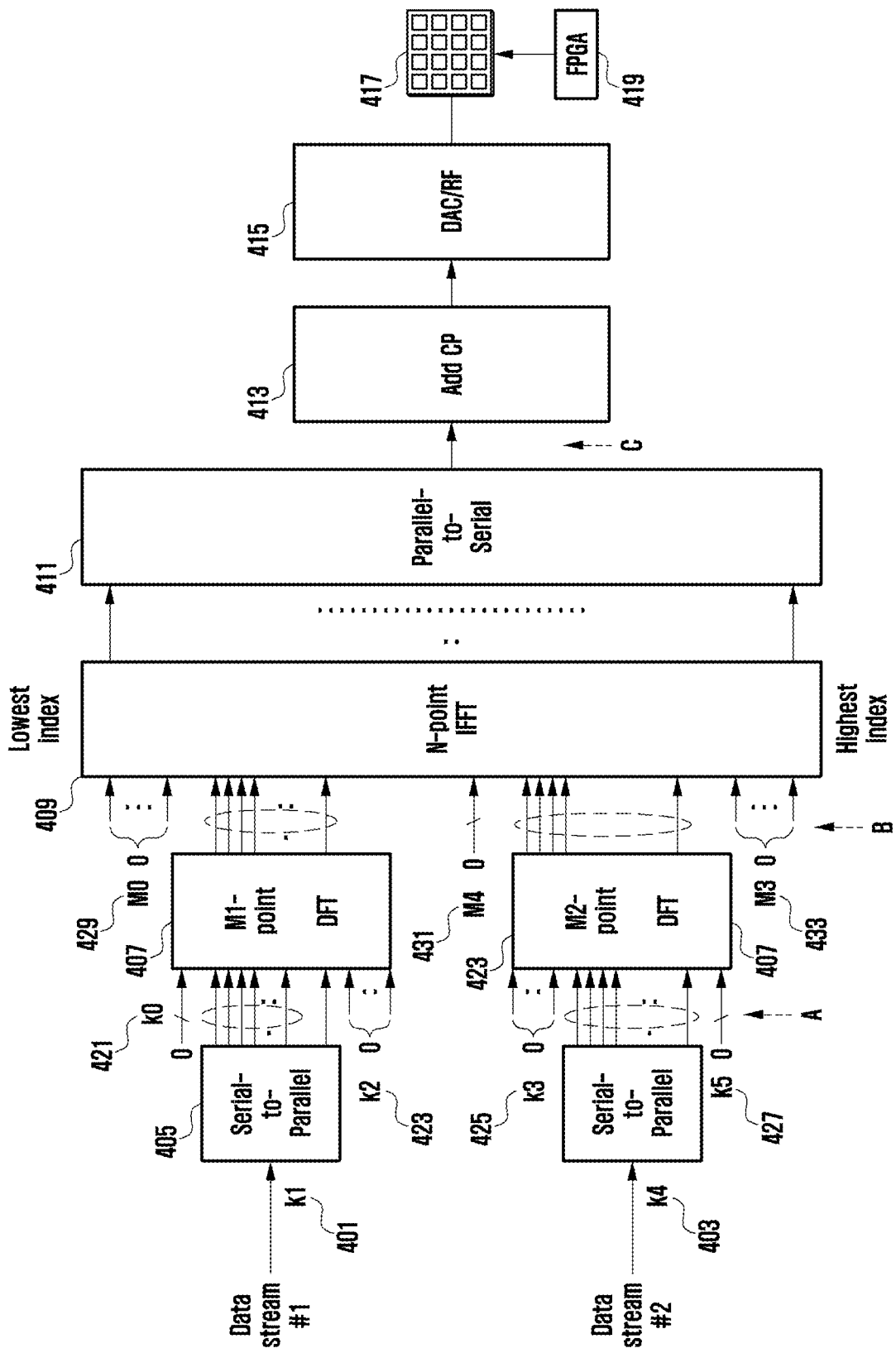
FIG. 4 is a view of an apparatus illustrating a method for configuring time sample resources and frequency resources in a multi-band single carrier transmission system proposed by the disclosure.

FIG. 4 is a view of an apparatus illustrating a method for configuring time sample resources and frequency resources in a multi-band single carrier transmission system proposed by the disclosure.

Referring to FIG. 4, the multi-band single carrier transmission system proposed by the disclosure may generate signals using twelve parameters of k0(421), k1(401), k2(423), k3(425), k4(403), k5(427), M0(429), M1(407), M2(423), M3(433), M4(431), and the disclosure includes a method and an apparatus for generating signals by adjusting at least one of the parameters. At least one of the parameters may also follow a predetermined rule, may be delivered via higher signaling, or included in control information of a control channel such as a PDCCH and delivered.

When the base station transmits two different data streams 1 and 2, first, each data stream 1 and 2 passes through serial-to-parallel converters 405, and then mapped into a M1 sized DFT preprocessor 407 and a M2 sized DFT preprocessor 423, respectively, to fit the bandwidth occupied by each. The data streams pass through the N-point IFFT 409 processed after DFT preprocessing 407 and 423. After passing through the parallel-to-serial converter 411, the data streams pass through the CP insertion unit 413, transmitted to the analog signal unit 415, and the data streams are transmitted from the antenna panel 417, connected with the FPGA 419.

Each parameter is explained as follows. The k0 421 is a parameter for emptying an initial k0/M1 time sample in an OFDM symbol. This can be used to adjust the CP length of the transmission signal. When using a predetermined CP length, k0=0 or k0 may be used as a predetermined fixed value. The k1 401 is the size of the virtual resource amount occupied by the first terminal (which may be mixed with user 1). The resource size means the number of modulated symbols transmitted in one OFDM symbol. If the base station performs SU-MIMO transmission, it should by considered that the number of modulation symbols is transmitted by multiplying the number of layers.

The k2 423 is a parameter representing the size of offset #1 that is configured so that the signals of user using different frequency bands on the time symbol do not overlap. The k3 425 is a parameter representing the size of offset #2 which is configured so that the signal of user 2 does not overlap with the signal of user 1 on the time symbol. The k4 403 means the size of the virtual resource amount occupied by the second terminal, that is, means the number of modulation symbols transmitted to user 2. Here, the k5 427 is a parameter representing the size of a zero sample added to prevent inter-symbol interference (ISI) is a symbol having no CP or a very short OFDM symbol.

The M0 429 is a parameter that configures a guard band of an area having a low frequency in a base station signal occupying a corresponding channel bandwidth. The M1 407 is a parameter that determines the number of sub-carriers occupied by user 1. It is also the DFT size applied to user 1. The M2 423 is a parameter that determines the number of sub-carriers occupied by user 2. It is also the DFT size applied to user 2. The M3 433 is a parameter for configuring a guard band of an area having a high frequency in a base station signal occupying a corresponding channel bandwidth. The M4 431 is a parameter representing the interval of the bandwidth occupied by user 1 and user 2 as the number of sub-carriers. The proposed operating parameter is applied to the frequency axis and the time axis to generate a signal, and the relationship between each parameter will be described with reference to FIG. 5.

Figure 5:
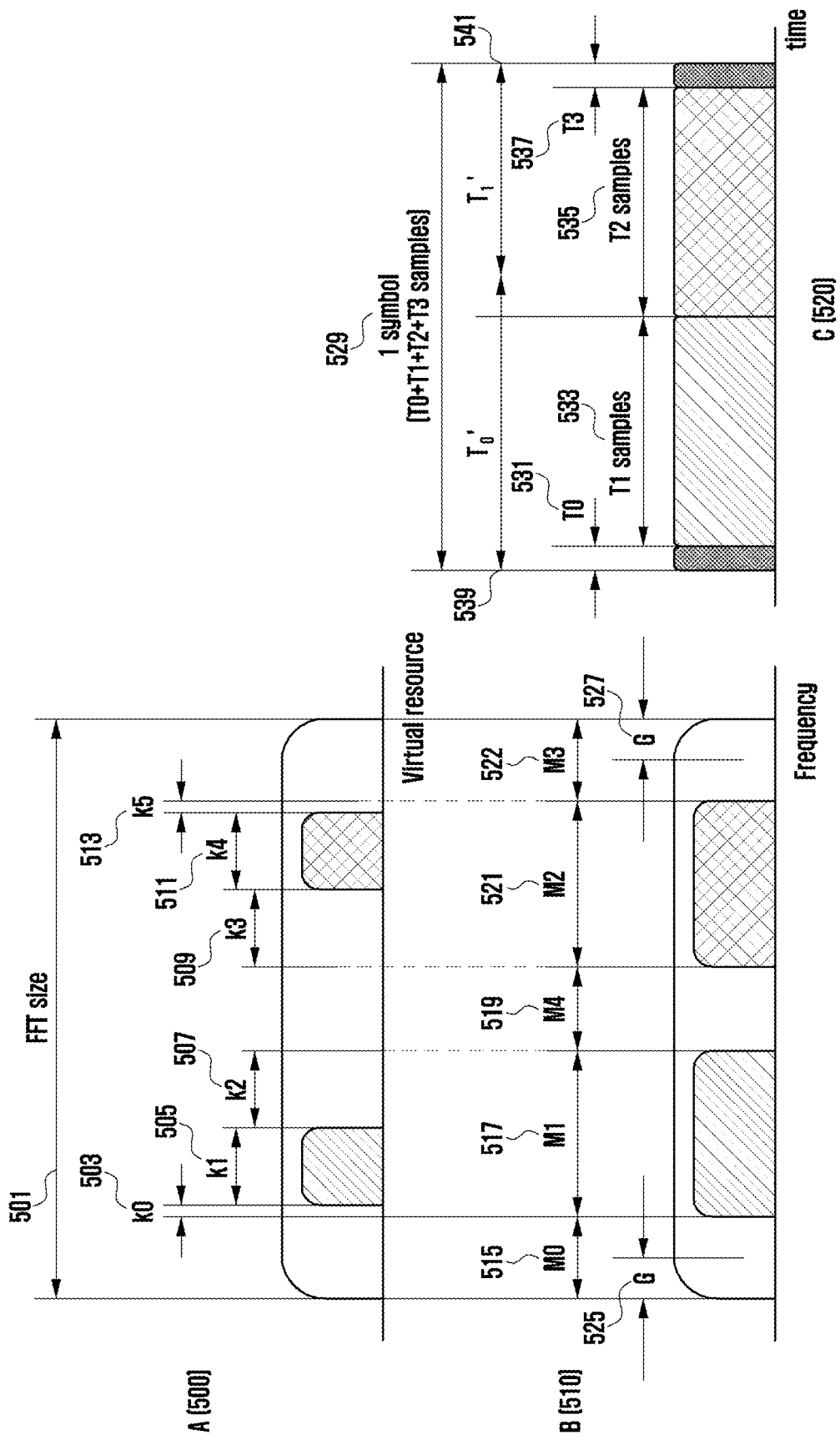
FIG. 5 is a view illustrating a method for configuring time sample resources and frequency resources in a multi-band single carrier transmission system proposed by the disclosure.

FIG. 5 is a view illustrating a method for configuring time sample resources and frequency resources in a multi-band single carrier transmission system proposed by the disclosure.

Referring to FIG. 5, FIG. 5 illustrates an example of signal generation using signals of two terminals or two bands, but may be equally applied to signal generation using signals of one or more terminals or signal generation using two or more bands. Reference numeral A 500 illustrates virtual resources input to the DFT preprocessors 407 and 423 in FIG. 4, reference numeral B 510 illustrates frequency band resources N-point IFFT 409 processed after DFT preprocessing in FIG. 4, and reference numeral C 520 illustrates a sample of a time symbol after parallel-to-serial conversion 411 in FIG. 4. In FIG. 5, although all 12 parameters are described, it is not necessary to know all parameters, based on one terminal. For example, user 1 uses at least M1 517, k1 505, and M0 515, and user 2 uses M0+M1+M4 (sum of 515, 517, 519), M2 512, K4 511 or k3 509.

FIG. 5 illustrates how each parameter relates in time and frequency domain. A case in which a signal occupying two frequency bands within the channel bandwidth 501 (FFT size) is transmitted. At 501, the left side means the lower frequency index and the right side means the higher frequency index. From a frequency point of view, to determine the occupied bandwidth, a guard band configuration is used, such as 525, and the lowest sub-carrier position of the band occupied by M1 517 may be designated via M0 515 to include the guard band. This lowest sub-carrier position can also be specified via M1–G. Similarly, the bandwidth occupied by M2 521 may be determined by indicating the size of M0+M1+M4 or indicating M0+M1+M4–G.

In order to adjust the time resource occupied by the user 1, the location of the virtual resource in the M1 should be adjusted, and the parameters for adjusting it are k0 503, k1 505, and k2 507. Similarly, in order to adjust the time resource occupied by the user 2, the location of the virtual resource in the M2 should be adjusted, and the parameters for adjusting it are k3 509, k4 511, and k5 513. Adjusting k0 503 changes the size of T0 503 in the time symbol, adjusting k1 505 changes the size of T1 533 in the time symbol, and adjusting k2 507 and k3 509 changes the size of T2 535 in the time symbol, and adjusting k5 513 changes the size of T3 537 in the time symbol. Therefore, the time symbol area and location of a single carrier can be adjusted via these parameters.

At this time, 1 symbol in the time axis in composed of $T_0'(539)+T_1'(541)$, $T_0'$ occupies M1/M1+M2 in 1 symbol, and $T_1'$ occupies M2/(M1+M2) in 1 symbol. Here, $T0=T_0' \cdot k0/(k0+k1)$, $T1=T_0' \cdot k1/(k0+k1)$, and $T2=T_1' \cdot k4/(k4+k5)$ and, $T3=T_1' \cdot k5/(k4+k5)$.

Figure 6:
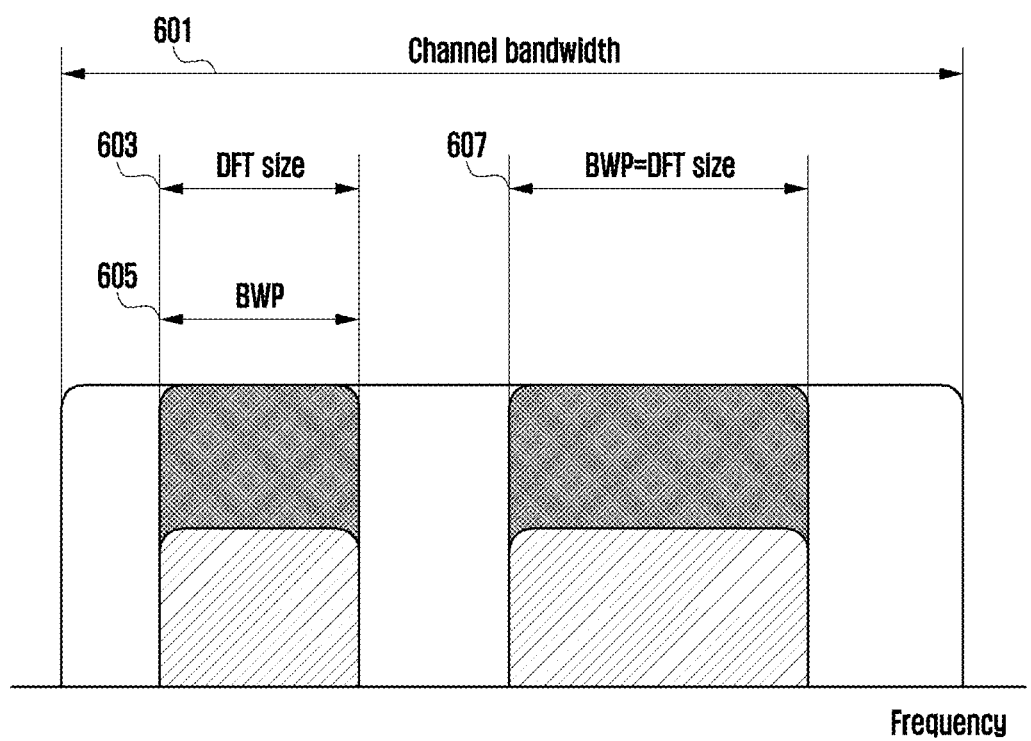
FIG. 6 is a view illustrating a method for configuring a single carrier bandwidth and a bandwidth of a terminal to be the same in a multi-band single carrier transmission system proposed by the disclosure.

FIG. 6 is a view illustrating a method for configuring a single carrier bandwidth and a bandwidth of a terminal to be the same in a multi-band single carrier transmission system proposed by the disclosure.

Referring to FIG. 6, the system may include one or more bandwidths, which may include a channel bandwidth 601 having the largest frequency bandwidth, a bandwidth part (BWP) 605, a scheduling bandwidth, and the like. Here, the channel bandwidth means the maximum bandwidth that the base station can operate in one channel and the BWP means the maximum bandwidth that the terminal can operate, which may be part of the channel bandwidth. The scheduling band means a bandwidth actually used for data transmission at the current scheduling time among the maximum bandwidths that the terminal can operate. Therefore, the configuration of a single carrier can also be configured in conjunction with the bandwidth.

Reference numerals 603 and 605 illustrate how the bandwidths of a BWO and a single carrier are configured identically. In this case, after the terminal recognizes that the downlink band uses a single carrier via high signaling or implicitly, the terminal may transmit a single carrier by applying the size of the bandwidth of the BWP at all times regardless of the use of the single bandwidth included in the BWP information configured from the base station and the scheduling bandwidth (the frequency domain occupied by the PDSCH).

If the base station additionally transmit a single carrier on the BWP 607 existing in different bands at the same time, the single carrier waveform can be maintained by the following two methods. The first method is to configure available resources in advance when setting (or configuring) BWP, and the second method is to configure resource allocation limits. Both methods are described in detail below.

The first method is to indicate the consecutive length and location of the PRB resources or sub-carriers available for BWP configuration. The location of the available sub-carrier may be known in the form of a comb spacing and a comb offset, which may be mixed with an offset. In addition, whether to interleave between PRBs and whether to interleave between sub-carriers may be indicated. In the case of using the first method, since the resources allocated in advance are indicated as described above, the overhead of control information used for resource allocation transmitted on the PDCCH can be reduced when the scheduling band is indicated by the PDCCH. For example, considering the case of indicating the consecutive PRB resources in advance, if the existing BWP is composed of 12 PRBs, 12 bits are used when the control information transmitted on the PDCCH is in a bitmap form. However, when the terminal receiving the control information in the BWP configuration indicates that six consecutive PRBs are used, the terminal may be scheduled using only 6 bits of control information.

If the available resource is indicated by the sub-carrier comb spacing and the comb offset, when the comb spacing is 2 and the offset is 1, only the offset 1 of the two comb spacings is used, unlike the case where the conventional PRB could use 12 sub-carriers, thus the number of sub-carriers available is 6 per PRB. Accordingly, when two PRBs are indicated, the amount of data transmitted via two PRBs is the same as when transmitting one PRB. Therefore, in the consecutive resource allocation information indicated by the control channel, the information indicating one existing PRB can be interpreted as indicating two PRBs, thereby reducing the amount of control information used for resource allocation by half. Specifically, if a conventional 6-bit bitmap indicates whether each resource is allocated to 6 PRBs, it is interpreted that one bit indicates whether to allocate resources of 2 PRBs. Thus, a 6-bit bitmap may indicate whether to allocate 12 PRBs. This method can be applied not only to bitmaps but also to various resource allocation methods. In addition, even if the comb information is configured, whether to actually use each comb may be indicated via a dynamically indicating bit included in the control information transmitted on the PDCCH. The method proposed in the disclosure has an advantage in that the base station transmitting a signal in more than one BWP can be used in a single carrier, but has a disadvantage in that it cannot be used when the BWP is overlapped on the frequency axis.

The second method is to restrict resource allocation. This method informs of PRB usage restriction information in PRB or sub-carrier units in BWP configuration information. In this case, when the scheduling band information is transmitted in the control channel by the base station, the terminal compares the restricted information with the restricted resources. When the scheduled band overlaps with the restricted resource and the scheduling band information, the terminal may receive the data channel assuming that the scheduled resource is not used and is rate matched when receiving data.

The proposed configuration method based on this method is as follows. If the BWP consists of a common BWP and a dedicated BWP, for a common BWP, the size of the BWP and the bandwidth of a single carrier are configured to be the same, and for the dedicated BWP, the transmission BWP activation information received from the common BWP may be configured to indicate whether to maintain a single carrier waveform when activating the dedicated BWP. In other words, when the terminal accesses the system, it receives the information of the common BWP or the control information set (CORESET) 0 (which may be a CORESET through which a PDCCH for receiving system information is transmitted). At this time, it is assumed that the consecutive PRBs configured in the common BWP or the CORSET 0 are the same as the band of the single carrier, and can receive the single carrier transmitted by the base station. Thereafter, the terminal may determine whether to use a single carrier transmission in a dedicated WP or/and receive a signal using resource configuration information for a single carrier via BWP activation information received in common BWP or CORESET 0.

Figure 7:
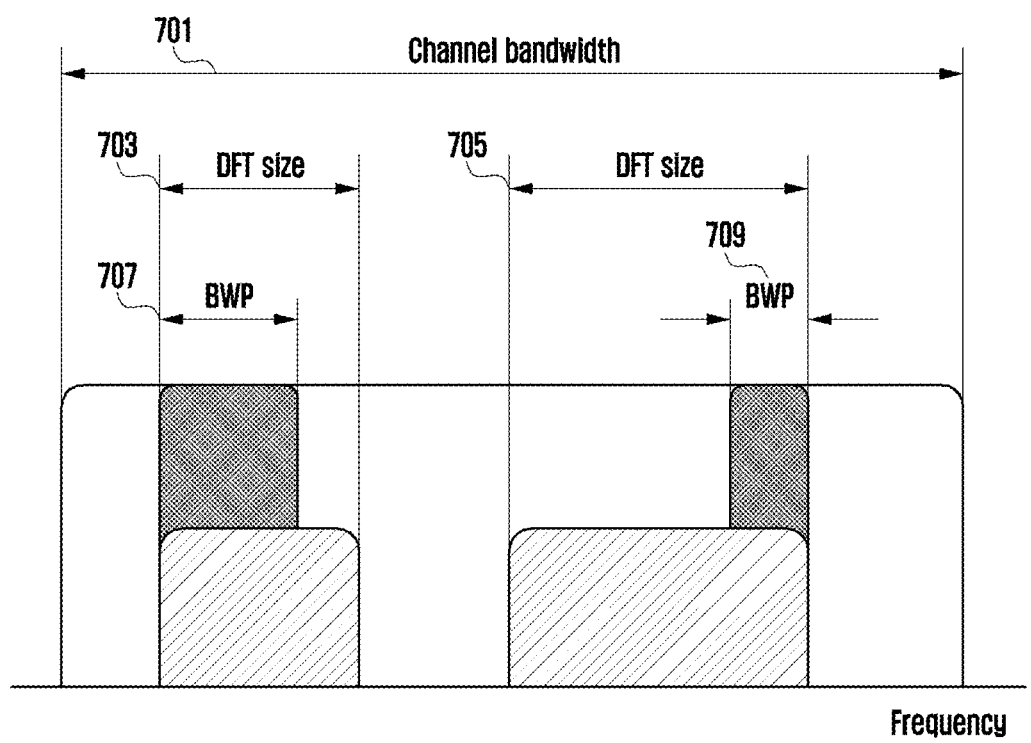
FIG. 7 is a view illustrating a method for configuring a single carrier bandwidth greater than a bandwidth of a terminal in a multi-band single carrier transmission system proposed by the disclosure.

FIG. 7 is a view illustrating a method for configuring a single carrier bandwidth greater than a bandwidth of a terminal in a multi-band single carrier transmission system proposed by the disclosure.

Referring to FIG. 7, the system may include one or more bandwidths, which may be configured with a channel bandwidth 701 having the largest bandwidth, a bandwidth portion (BWP) 707, a scheduling bandwidth, and the like. Here, the channel bandwidth mean the maximum bandwidth that the base station can operate in one channel, the BWP means the maximum bandwidth that the terminal can operate, and the scheduling bandwidth means the bandwidth actually used for data transmission at the current scheduling time of the maximum bandwidth that the terminal can operate. Accordingly, the configuration of a single carrier can also be configured in conjunction with the bandwidth.

FIG. 7 illustrates a method of configuring the BWP 707 to be less than or equal to the bandwidth 703 of a single carrier. That is, the bandwidth of the single carrier is independent of the bandwidth of the BWP, but the bandwidth of the single carrier includes the bandwidth of the BWP. In this case, after the terminal recognizes implicitly or recognizes via higher signaling that the downlink band uses a single carrier, the terminal transmits a single carrier by applying a size of a single carrier bandwidth regardless of whether a single carrier is included in the single carrier configuration information configured from the base station and scheduling bandwidth. The base station explicitly indicates the length of a time symbol occupied by a single carrier bandwidth via BWP information included as sub-information of single carrier configuration information, and when another BWP is simultaneously configured in one symbol like 709 via BWP resource allocation information, the base station may implicitly indicate that another BWP can maintain a single carrier without overlapping within the same symbol. This method can be used when the bandwidth of a single carrier is larger or longer than the BWP bandwidth, and can also be used when resources are allocated continuously (when consecutive PRBs are used).

Figure 8:
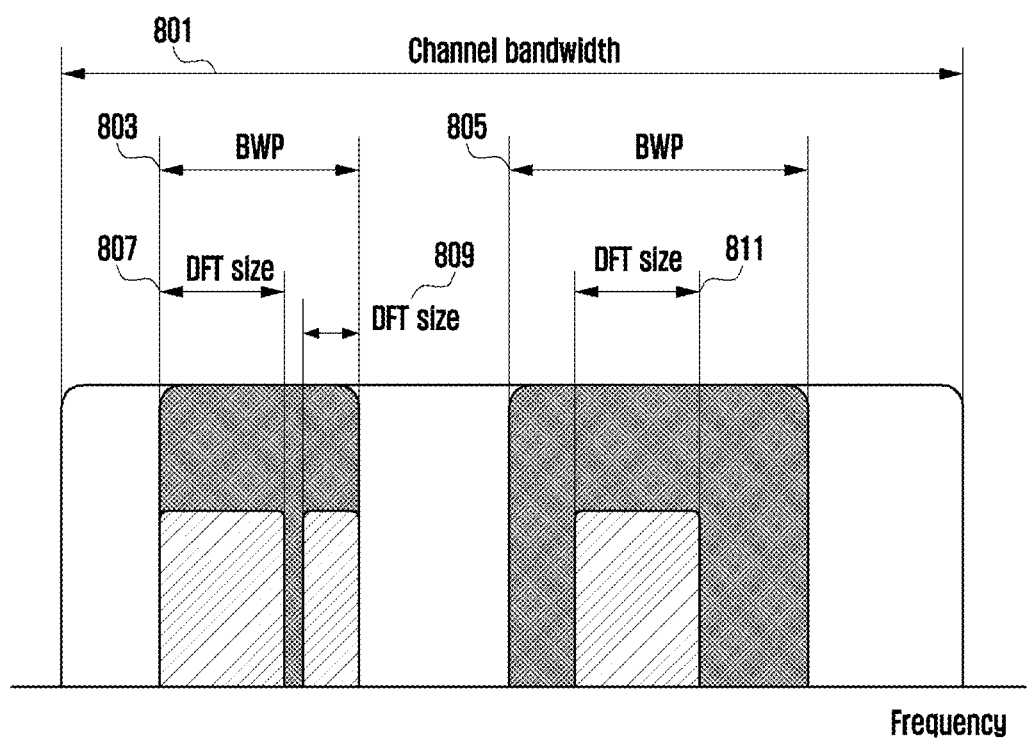
FIG. 8 is a view illustrating a method for configuring one or more single carrier bandwidths within a bandwidth of a terminal in a single carrier transmission system proposed by the disclosure.

FIG. 8 is a view illustrating a method for configuring one or more single carrier bandwidths within a bandwidth of a terminal in a single carrier transmission system proposed by the disclosure.

Referring to FIG. 8, the system may include one or more bandwidths, which may be configured with a channel bandwidth 801 having the largest frequency bandwidth, a bandwidth portions (BWPs) 803 and 805, a scheduling bandwidths 807, 809 and 811, and the like. Here, the channel bandwidth mean the maximum bandwidth that the base station can operate in one channel, the BWP means the maximum bandwidth that the terminal can operate, and the scheduling bandwidth means the bandwidth actually used for data transmission at the current scheduling time of the maximum bandwidth that the terminal can operate. In this case, the bandwidth of a single carrier can be configured only in conjunction with the scheduling bandwidth.

Reference numerals 807 and 809 illustrate the scheduling bandwidth in which signals are actually transmitted within the BWP. For example, the signal of the scheduling bandwidth 809 may be transmitted to user 1 and the signal of the scheduling bandwidth 807 may be transmitted to user 2. In another example, the reference numeral 807 may be used to transmit a control channel of user 1 and the reference numeral 809 may be used to transmit a data channel of user 1. If only one single carrier band (for example, 807) is transmitted in one symbol, the terminal may receive a single carrier waveform signal using all the symbols, but if the base station transmits a signal using a single carrier of one or more bands, the base station should transmit resource allocation information for receiving a multi-band single carrier using a control channel for receiving a data channel of the terminal.

The terminal may receive one or more resource allocation information for one BWP of the terminal via higher signaling, one is resource allocation information for single band single carrier transmission, and the other is information for multi-band single carrier transmission. Here, the multi-band single carrier transmission information may be composed of a plurality of information supporting one or more bands. For example, in the case of single-band single carrier transmission, resource allocation information includes information about the presence or absence of a single carrier. In the case of multi-band single carrier transmission, the multi-band single carrier information may include the aforementioned resource information (PRB resource, sub-carrier comb and comb offset). This allows one or more sub-carrier comb and comb offsets to be configured to support multiple bands. The indicator indicating the resource configured as described above may be delivered with the scheduling information to the terminal via the control information of a control channel, or may be configured to a slower speed (than configuration via control information of a physical channel) via a MAC CE that can be received via a PDCCH transmitted via CORESET 0.

Figure 9:
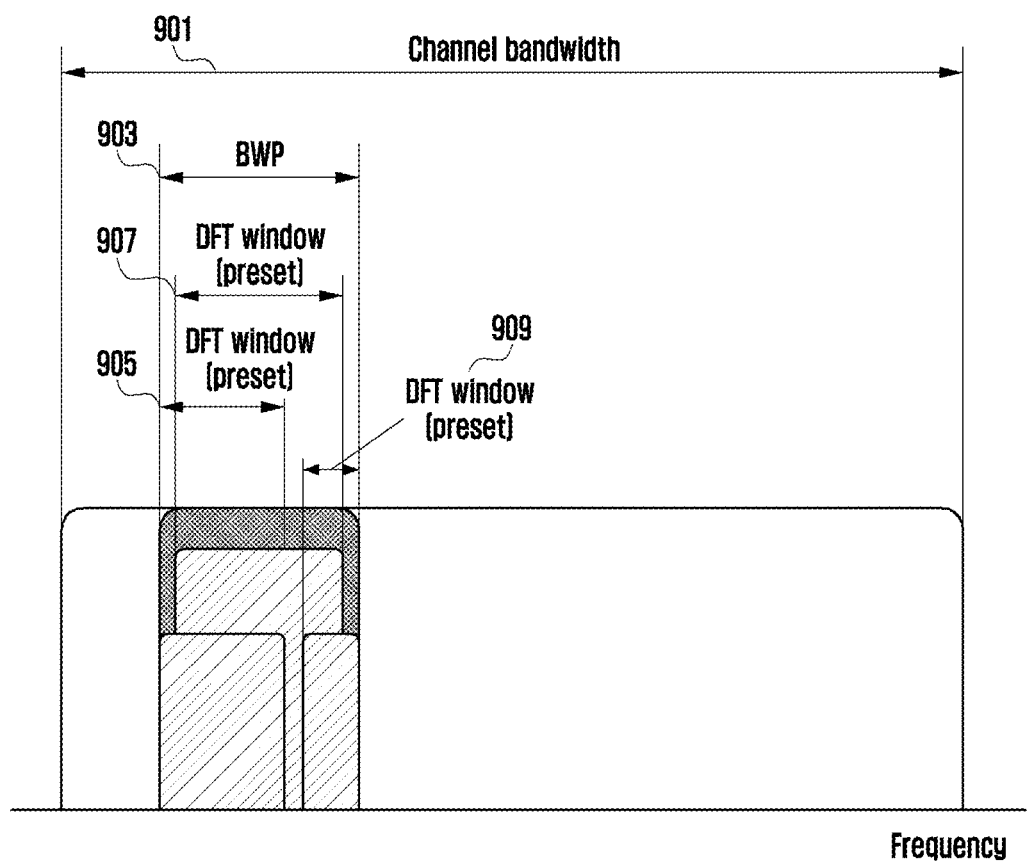
FIG. 9 is a view illustrating another method for configuring one or more single carrier bandwidths within a bandwidth of a terminal in a multi-band single carrier transmission system proposed by the disclosure.

FIG. 9 is a view illustrating another method for configuring one or more single carrier bandwidths within a bandwidth 903 of a terminal in a multi-band single carrier transmission system proposed by the disclosure.

FIG. 9 illustrates a method in which a terminal is previously configured with at least one single carrier band 905, 907, 909 and blindly searches for a single carrier band used by a base station for transmission. When the terminal receives a control channel such as a PDCCH, the terminal may search for one or more single frequency bands on which a signal is transmitted based on a predetermined single frequency transmission configuration. In addition, a plurality of single carrier band candidates 905, 907, 909 may be configured with different resource allocation information (DFT size, frequency location, comb, offset), and the terminal may receive signals by searching one or more bands as well as one band at a time.

In the following, a method of controlling transmission power in multi-band single carrier transmission will be described. For multi-band single carrier transmission, the base station can determine the transmission power in two ways. The first method is to maintain the average power identically between samples within a symbol, and the second method is to maintain the average power between bands differently between samples within a symbol.

Figure 10:
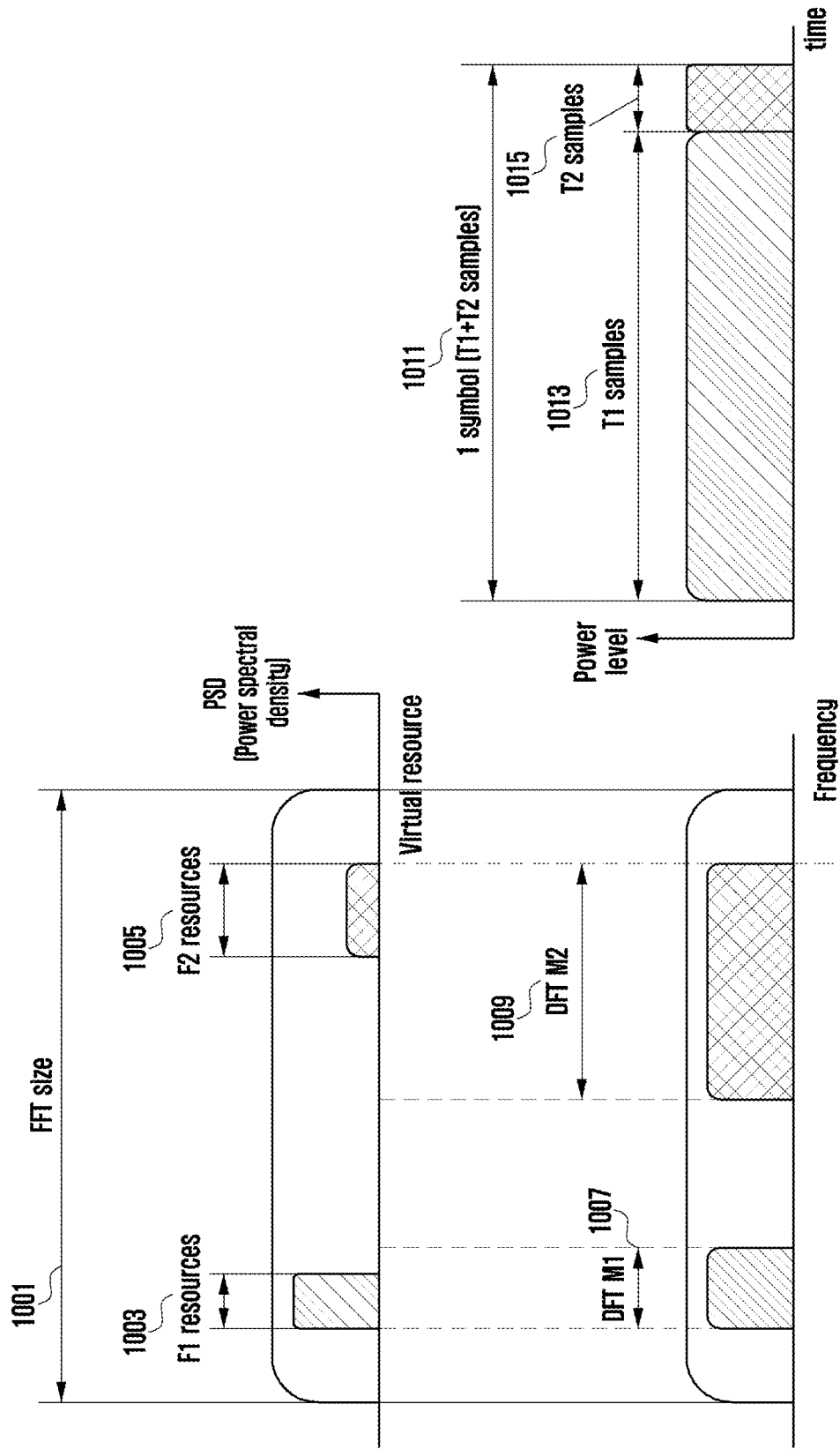
FIG. 10 is a view illustrating a first method for equally configuring average power between symbols in multi-band single carrier transmission proposed by the disclosure.

FIG. 10 is a view illustrating a first method for equally configuring average power between symbols in multi-band single carrier transmission proposed by the disclosure.

Referring to FIG. 10, the method proposed in FIG. 10 is a method of maintaining the sample PAPR low in the symbol in consideration of the size of multiple bandwidths in order to reduce the PAPR in the symbol. Assuming 1001 is a channel bandwidth, 1007 and 1009 are different bands occupied by a single carrier bandwidth, 1007 and 1009 are used as multiple bands for a single carrier. At this time, when a single carrier corresponding to each band is transmitted using a DFT preprocessor, it is assumed that an M1 sized DFT is applied to the band 1007 and an M2 sized DFT is applied to the band 1009. At this time, in order to maintain the same reference power or average power used by all samples from the time symbol 1011 point of view, the condition can be maintained by adjusting the lengths of the sample 1013 occupied by the band 1007 and the sample 1015 occupied by the band 1009. For example, when T1=M2/(M1+M2), T2=M1/(M1+M2), the average power of the sample 1013 transmitted to T1 and the average power of the sample 1015 transmitted to T2 may remain the same.

In this case, the base station may indicate such a transmission power configuration by indicating the terminal to beta (power ratio, the ratio of power used for actual transmission to the power used when using the entire sample) at 0 dB, indicating the length of T1, or maintaining resource allocation information equal to T1. If the transmission power needs to be increased or decreased to maintain coverage, the base station may indicate an offset to the terminal. For example, if the power ratio corresponding to the band 1007 is beta 1 and the power ratio corresponding to the band 1009 is beta 2, beta 1 and beta 2 can be adjusted via k. As such, when the base station indicates k, beta 1 and beta 2 can be defined as in the following example.

Beta1=10 log {(1+k)M2/(M1+M2)}(dB),

Beta2=10 log {(M1−kM2)/(M1+M2)}

The base station may indicate the power ratio to the terminal to increase the reception performance.

Figure 11:
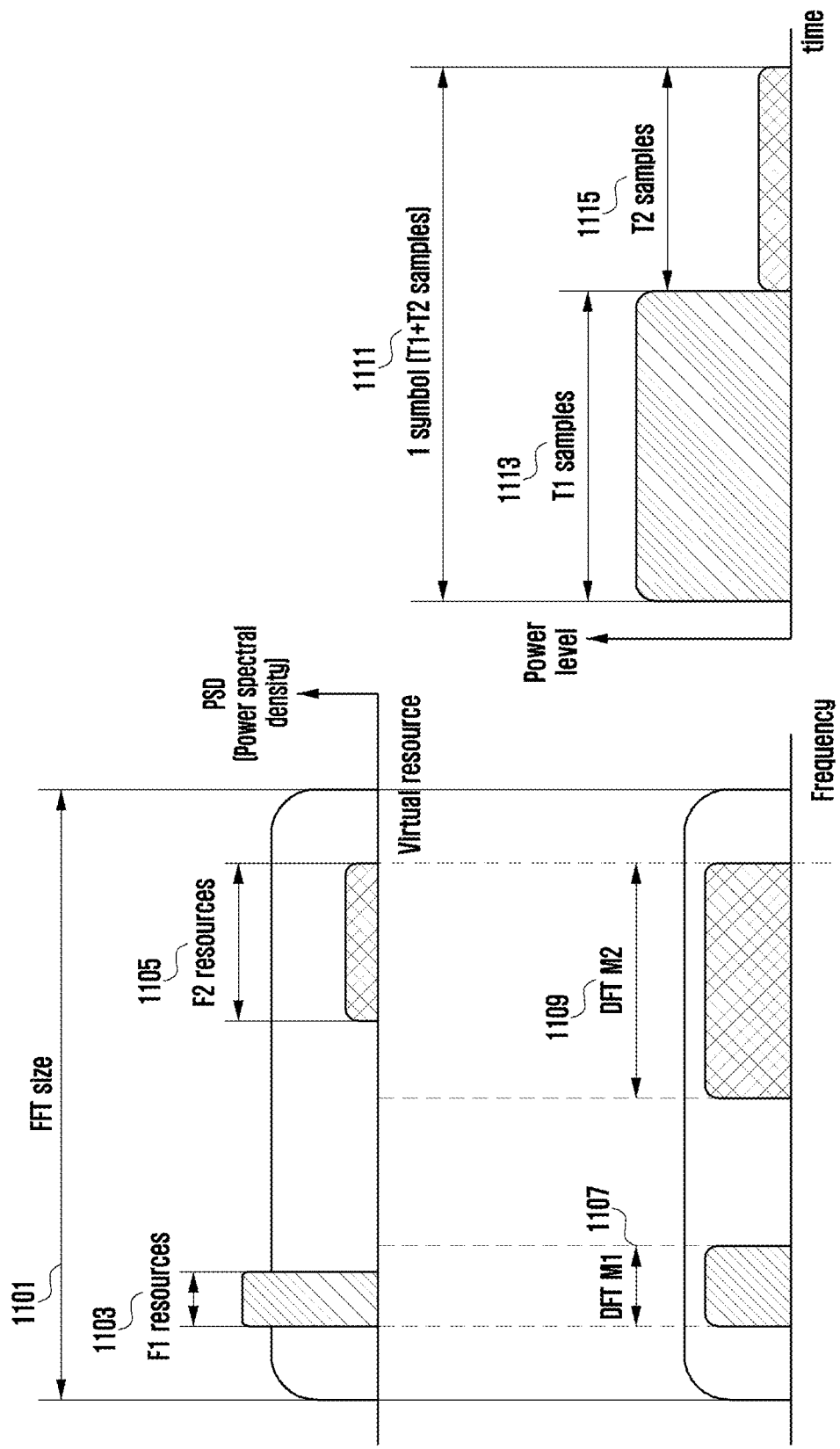
FIG. 11 is a view illustrating a second method for differently configuring transmit power in a symbol in multi-band single carrier transmission proposed by the disclosure.

FIG. 11 is a view illustrating a second method for differently configuring transmit power in a symbol in multi-band single carrier transmission proposed by the disclosure.

Referring to FIG. 11, the method proposed in FIG. 11 is a method of controlling power in a symbol in consideration of a coverage state of a terminal in order to reduce PAPR for each band in a symbol and simultaneously maintaining a low PAPR. Reference numeral 1101 denotes a channel bandwidth and reference numeral 1111 denotes a corresponding time symbol includes T1 samples 1113 and T2 samples 1115. The method proposed in FIG. 11 is a method of distributing a transmission power between users according to a ratio of the occupied bandwidth and a time product. If the size of the band 1107 occupied by user 1 is M1, the time occupied by user 1 (in one symbol) is T 1113, the size of the band 1109 occupied by user 2 is M2, and the time occupied is 1−T 1115, the total transmission power P becomes P=M1·T+M2(1−T), and the power distribution between users depends on the ratio of beta1×M1·T:beta2×M2(1−T), and beta1×M1·T:beta2×M2(1−T)=P. Here, beta1 may be understood as power ratio of user 1, and beta2 may be understood as power ratio of user 2. Accordingly, the base station indicates a user of a beta value, and the terminal may acquire the receives power, based on the indication. This may be understood as a method of adjusting the transmission power of time-axis samples via resource allocation.

The method proposed in FIG. 11 may be used to symbols for retransmission of a data channel transmitted via a single carrier. For example, when the base station performs retransmission of an incremental redundancy (IR) scheme, in general, the number of symbols to be retransmitted may be configured than the number of symbols used for initial transmission. In the case of using the method of FIG. 11, the base station may perform initial transmission using the resource amount of 1003 of FIG. 10 and retransmission using the reduced amount of 1103. In this case, since the transmission power of the transmitted sample is increased to 1111 (compared to 1011 of FIG. 10), a signal-to-noise ratio (SNR) per sample may be increased, thereby increasing the probability of success of retransmission.

Hereinafter, a method of controlling interference between multiple terminals or interference between a plurality of base stations using a single carrier transmission will be described.

Figure 12:
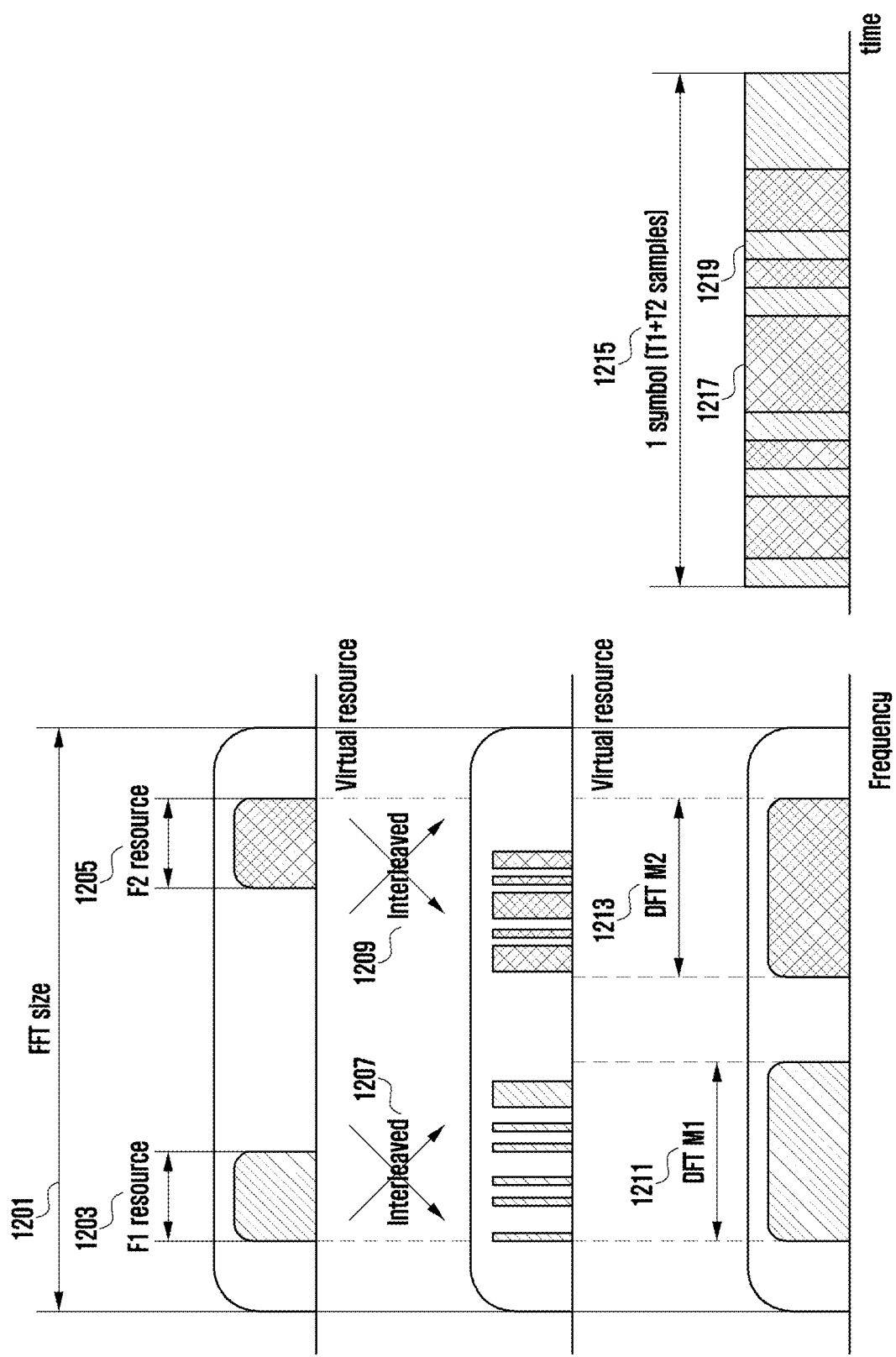
FIG. 12 is a view illustrating a multiplexing method for minimizing interference of signals of one or more multiple terminals simultaneously transmitted in multi-band single carrier transmission proposed by the disclosure.

FIG. 12 is a view illustrating a multiplexing method for minimizing interference of signals of one or more multiple terminals simultaneously transmitted in multi-band single carrier transmission proposed by the disclosure.

Referring to FIG. 12, FIG. 12 illustrates a method of using interleavers 1207 and 1209 to allow user signals 1203 and 1205 using different bands to occupy orthogonal times (i.e., non-overlapping times) in the transmission symbol 1215. The user signals 1203 and 1205 are dispersedly mapped to signal carrier bandwidths 1211 and 1213 via interleavers 1207 and 1209. Interleaver operation may be performed on signals of different bands transmitted in the same symbol via the following three methods. The disclosure may be performed based on a method 1) interleaver based on symbol index, method 2) interleaver based on base station identifier, method 3) interleaver based on slot index. These interleavers allows each band 1203 and 1205 to occupy time sample 1 1219 and time sample 2 1217 on time symbol 1215, respectively. The time sample 1 1219 and the time sample 2 1217 may not overlap and may be orthogonal to each other.

In addition, the method proposed in the present invention may be used for diversity transmission which occupies orthogonal time with each other while transmitting data signals transmitted to one terminal in different bands 1203, 1205. The first method for this is a method for the base station to generate a data signal, copy the data signal and transmit the same data in different bands 1203, 1205. In this case, since the same data is transmitted in different frequency bands within the same symbol, the base station can transmit data more robustly through diversity.

The second method is that a base station generates a data signal and separates the generated data signal into a first data symbol group and a second data symbol group, so that the first data symbol is transmitted in the band of 1203 and the second data symbol is transmitted in the band of 1205. The method of separating the first data symbol group and the second data symbol group may include a method of separating by the number of symbols, a method of separating by a codeword index, and a method of separating by layer. In the method of dividing by the number of symbols, for example, when the number of generated data signals is n, the first data symbol group may include n-m data symbols, and the second data symbol group may include m data symbols. For example, in a method of separating the codeword indexes, when the four codewords are generated, the first data symbol group includes CW #1 and CW #3 and the second data symbol group includes CW #2 and CW #4. It may be. In method of separating by layer, a plurality of layers in which data symbols of a codeword are arranged in each layer are generated through layer mapping, and each layer is included in each data symbol group. For example, the first data symbol group may include layers #1, #3, #5, and #7, and the second data symbol group may include layers #2, #4, #6, and #8 when 8 layers are generated. Mapping to the data symbol group for each layer may be performed in the layer mapping step.

In particular, in the case of the method of separating by layer, the base station generates the data signal as rank 2 (that is, 2 layers are generated) even when the rank through feedback of the terminal (the rank can be understood as the recommended number of layers of data reported to the base station by the terminal) is 1 and transmit the data to different bands 1203, 1205 for each layer. The above method is a method of obtaining diversity gain by transmitting a different frequency band for each layer while maintaining rank 1 data channel transmission. If the number of bands to which a base station transmits a signal is L (when using L DFT windows), the base station generates a data channel with the maximum rank L (that is, generates L layers) and then in each of the L bands. Rank 1 transmission can be maintained by transmitting data signals according to each layer.

If the base station and the terminal uses a cross-polarized antenna and the feedback of the terminal is rank 2, the base station generates the signal of the data channel as rank 2 and transmit each layer in different bands 1203, 1205 or generating data channel signal as rank 4 and transmits each of the two layers in different bands 1203, 1205 for obtaining diversity gain. In this case, four layers may be generated by copying two layers, respectively, or by dividing a data symbol of one layer into two layers.

In addition, according to the interleavers 1207, 1209 of FIG. 12, signals transmitted to each terminal may occupy orthogonal times (non-overlapping times) or pseudo orthogonal times. When a signal transmitted to each terminal occupies an orthogonal time, a correlation of a sample unit between transmission symbols of bands 1203, 1205 may be guaranteed to be zero. When a signal transmitted to each terminal occupies a pseudo orthogonal time, the base station may transmit a signal such that the correlation of the sample unit between transmission symbols of the 1203, 1205 bands is guaranteed to be 1/C or less. To this end, the base station may configure the respective interleavers 1207, 1209 so that the correlation is below a certain threshold, or allocate resources such that the rate of overlapping samples on the time axis occupied by the signal transmitted to each terminal is below a certain threshold. At this time, the base station may determine M1 and/or M2 such that the correlation is below a certain threshold or the rate at which samples overlap is below a certain threshold. In this case, there is a disadvantage in that the PAPR increases compared to the case where the signal transmitted to each terminal occupies an orthogonal time, but there is an advantage in that the efficiency of using the resource increases.

Figure 13:
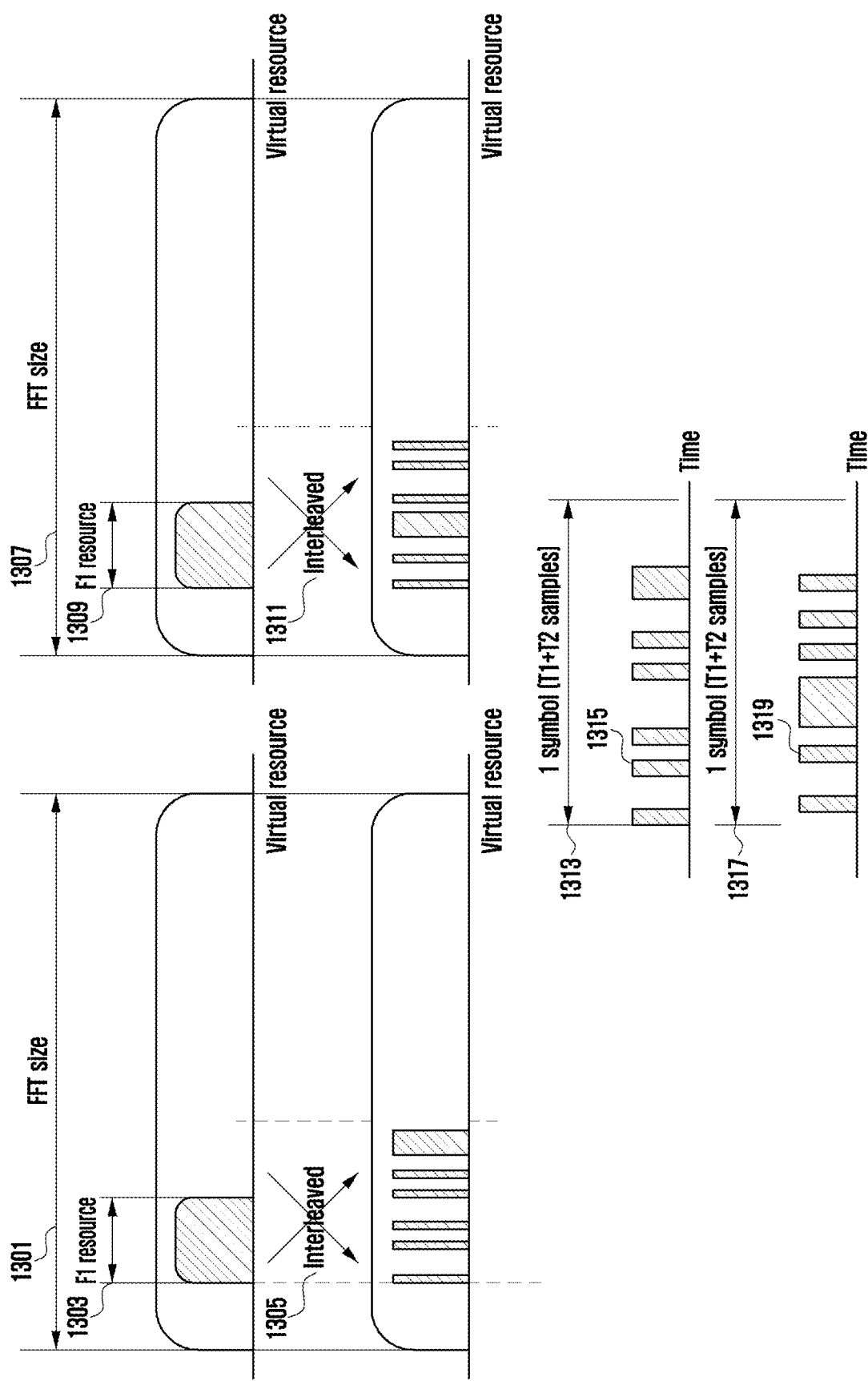
FIG. 13 is a view illustrating an interference control method between different terminals in multi-band single carrier transmission proposed by the disclosure.

FIG. 13 is a view illustrating an interference control method between different base stations in multi-band single carrier transmission proposed by the disclosure. Referring to FIG. 13, the proposed embodiment is a method of using an interleave occupying non-orthogonal times between users or cells. That is, the interleaver operation may be performed on signals transmitted from different base stations transmitted at the same time by the following method. The disclosure includes a method 1) an interleaver based on a user identifier, a method 2) an interleaver based on a base station identifier, and a method 3) an interleaver using different random number generation functions. Reference numeral 1303 denotes a band of a signal transmitted from the base station 1, and reference numeral 1309 denotes a band of a signal transmitted from the base station 2. The symbols of each band are mapped to virtual resources distributed through the interleavers 1305 and 1311, and are transmitted from each base station as a single carrier signal through DFT conversion. At this time, the signal of each base station is transmitted in symbols 1313 and 1317 of the same time, the signal of base station 1 occupies a time sample equal to 1315 in symbol 1313, and the signal of base station 2 occupies a time sample equal to 1319 in symbol 1317. In this way, since signals from different base stations are distributed on the time axis, interference between different base stations can be controlled.

Figure 14:
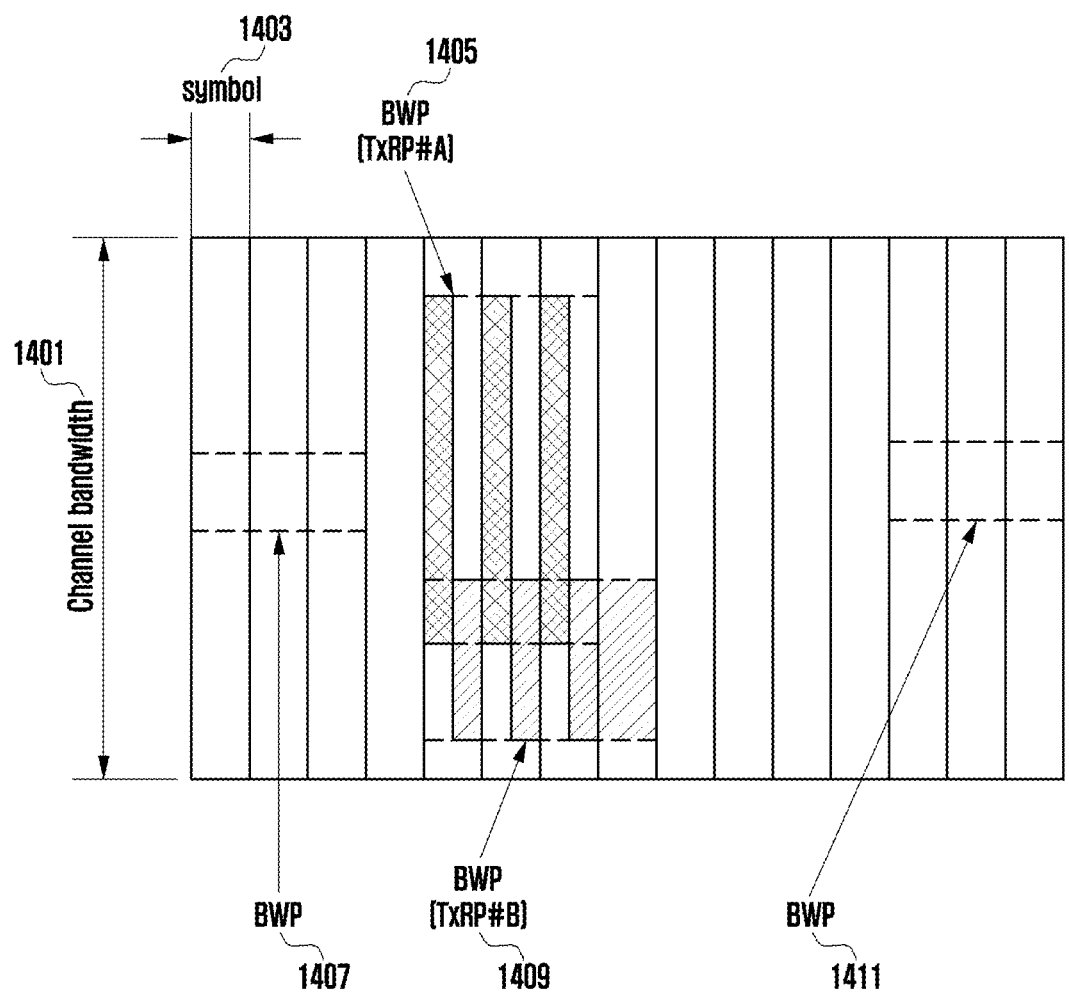
FIG. 14 is a view illustrating an interference control method between base stations when one or more base stations using a multi-band single carrier transmission scheme proposed by the disclosure use different sub-carrier intervals.

FIG. 14 is a view illustrating an interference control method between base stations when one or more base stations using a multi-band single carrier transmission scheme proposed by the disclosure use different sub-carrier intervals in a channel bandwidth 1401. Referring to FIG. 14, the proposed embodiment is a method in which terminals of different groups receiving different BWPs (for example, 1407) receive signals according to different BWPs in the same symbol. This is possible via the following methods.

According to method 1, when two different BWPs have the same sub-carrier spacing, signals of each BWP may be transmitted using positions of samples that are orthogonal to each other (that is, do not overlap on the time axis). According to method 2, when two different BWPs have different sub-carrier spacings, in a BWP 1405 where the sub-carrier spacing is relatively large (which is twice the bandwidth of other BWPs, which may be the BWP used in TxRP1), the symbol length of the symbol 1403 is reduced by half because the sub-carrier spacing is inversely proportional to the symbol length. In this BWP, only some of the available symbols are used for transmission. For example only the odd (or even) symbols, may be used for transmission. The other BWP 1409 (this may be the BWP used in TxRP2) may use the position of some samples (in which no signal according to BWP 1405 is transmitted) in one symbol, and thus signals according to two BWPs may be transmitted orthogonally. In addition, for such interference control, both base stations TxRP1 and TxRP2 may transmit and receive information related to resources to which they can allocate data transmission. Each base station may perform data transmission based on a single carrier based on the resource allocation information.

Figure 15A:
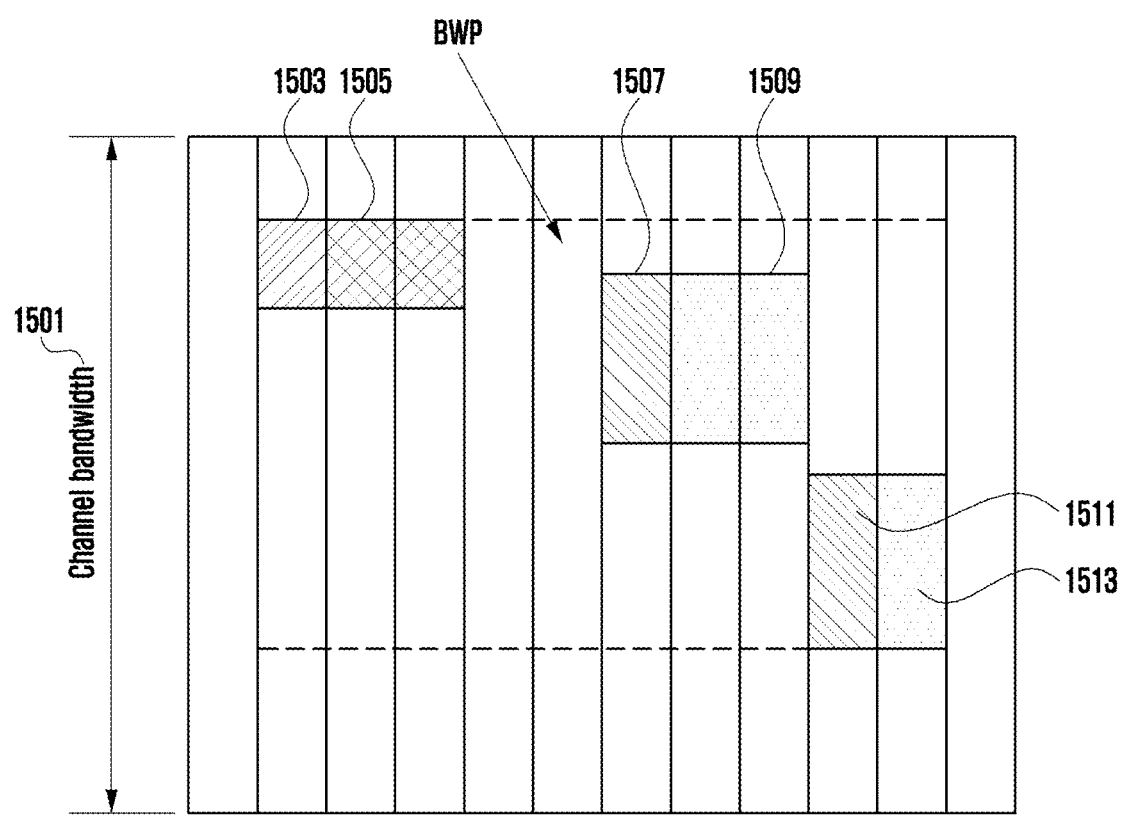
FIG. 15A is a view illustrating a structure in which one or more different channels are transmitted in different symbols in multi-band single carrier transmission proposed by the disclosure.
Figure 15B:
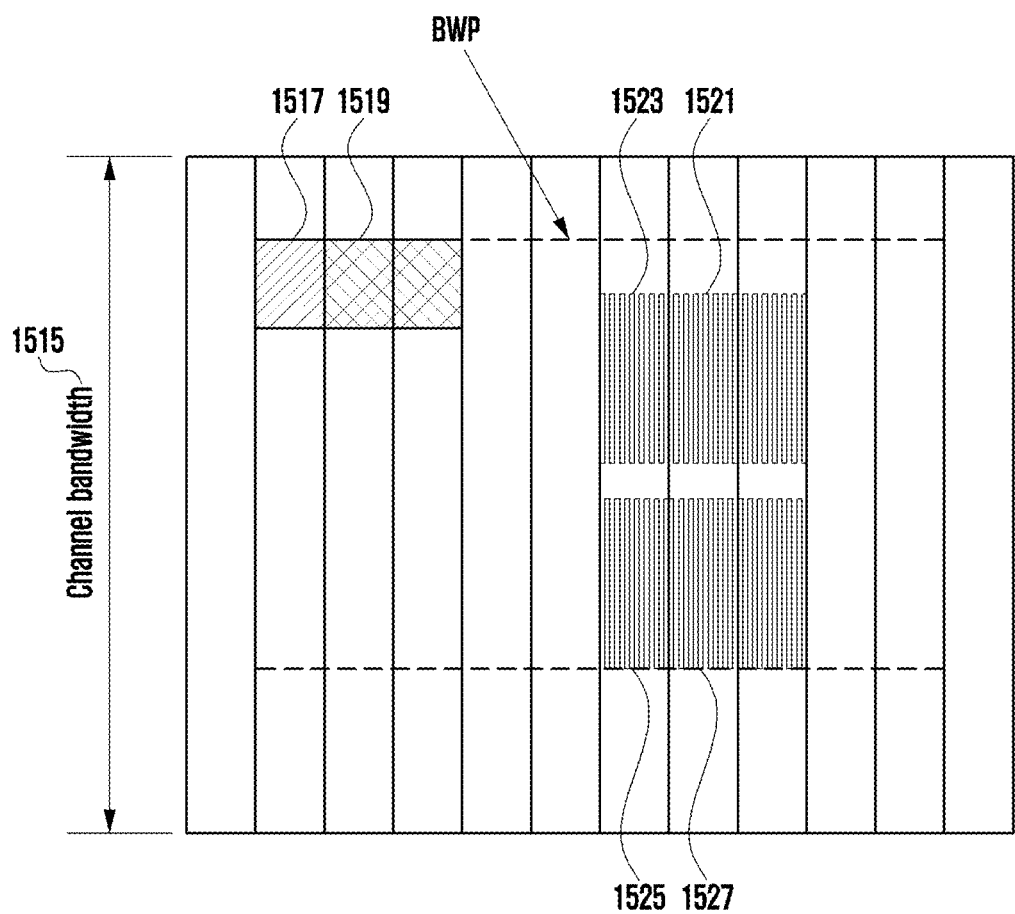
FIG. 15B is a view illustrating a packet structure in which one or more different channels are multiplexed and transmitted in one symbol in multi-band single carrier transmission proposed by the disclosure.

FIG. 15A is a view illustrating a structure in which one or more different channels are transmitted in different symbols in multi-band single carrier transmission proposed by the disclosure in a channel bandwidth 1501. Referring to FIG. 15A, a reference signal 1503 for a control channel, the control channel 1505, reference signals 1507 and 1511 for a data channel, and the data channels 1509 and 1513 may be transmitted in different symbols. In this case, the data channel may be transmitted after the control channel is transmitted. FIG. 15B is a view illustrating a packet structure in which one or more different channels are multiplexed and transmitted in one symbol in multi-band single carrier transmission proposed by the disclosure in a channel bandwidth 1515. Referring to FIG. 15B, a reference signal 1517 for a control channel, the control channel 1519, reference signals 1523 and 1525 for a data channel, and two reference signals 1523 and 1525 for the data channel in the data channels 1521 and 1527 and the data channels 1521 and 1527 may be transmitted in the same symbol such that each of the reference signals 1523 and 1521, 1525 and 1527 do not overlap each other. That is, different data and reference signals may be transmitted in the symbol. According to FIG. 15B, it can be seen that the transmission delay is reduced compared to the method of FIG. 15A.

Figure 16A:
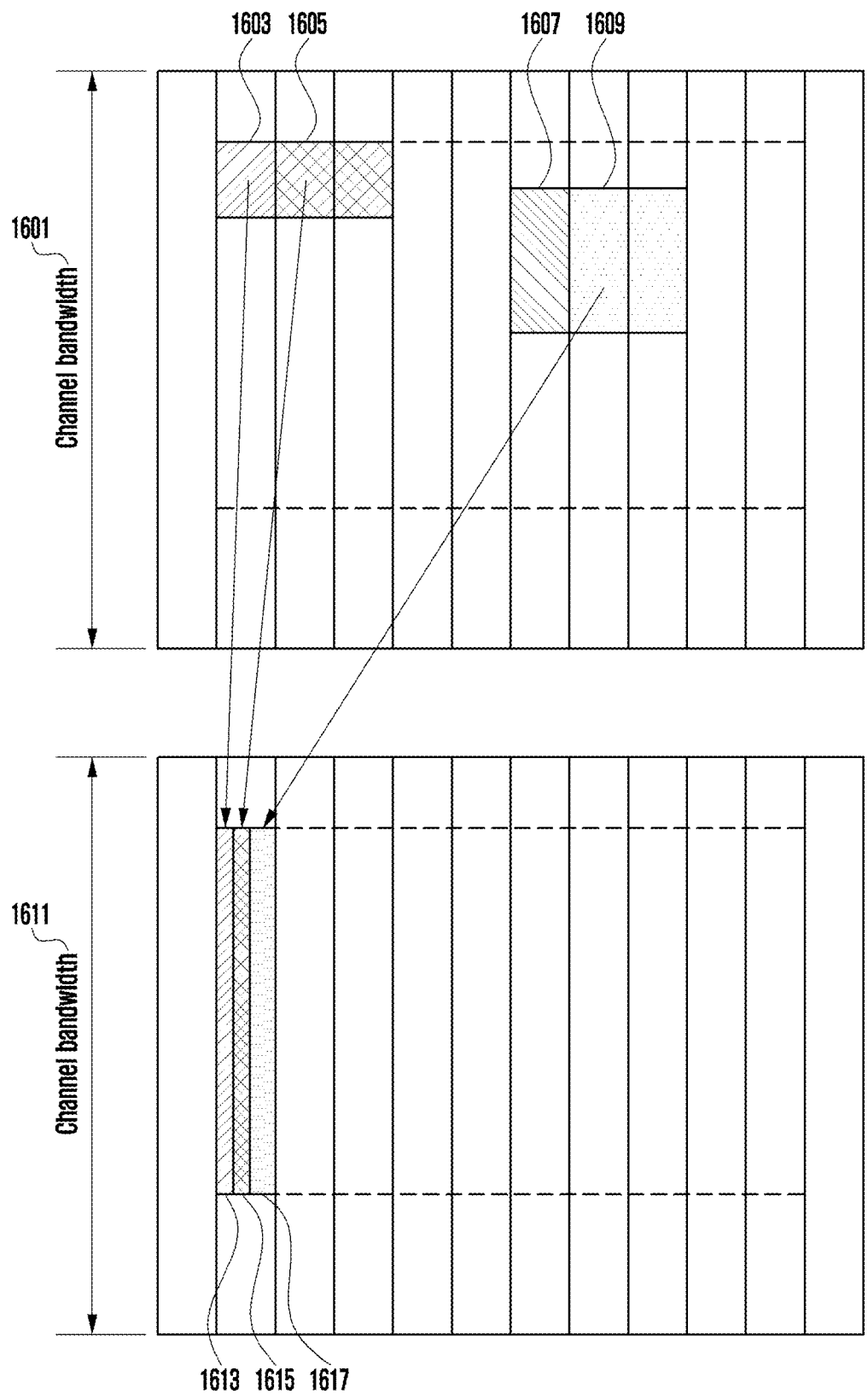
FIG. 16A is a view illustrating a packet structure in which one or more different channels are multiplexed and transmitted in one symbol in order to reduce transmission delay time in multi-band single carrier transmission proposed by the disclosure.
Figure 16B:
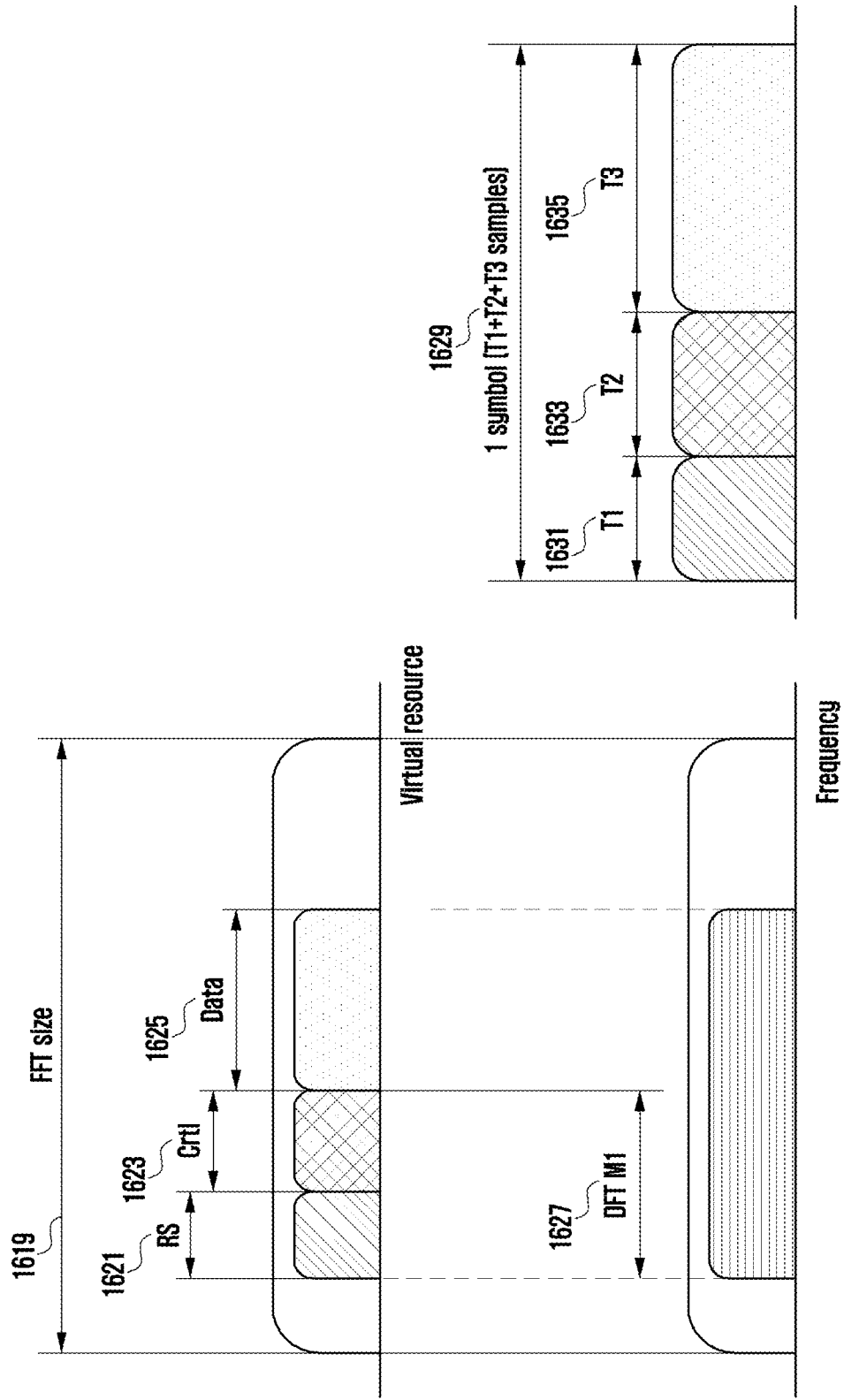
FIG. 16B is a view illustrating a method for multiplexing different channels in one symbol.

FIG. 16A is a view illustrating a packet structure in which one or more different channels are multiplexed and transmitted in one symbol in order to reduce transmission delay time in multi-band single carrier transmission proposed by the disclosure. Referring to FIG. 16A, in a channel bandwidth 1601, 1611, a reference signal 1603 for a control channel, a control channel 1605, a reference signal 1607 for a data channel, and a data channel 1609, which are mapped over the existing symbols, may all be transmitted in one symbol 1613, 1615 and 1617. In this case, the reference signal 1607 for the data channel may be omitted when mapped to one symbol. Alternatively, both the control channel and the data channel may be demodulated with one reference signal 1613. At this time, the reference signal 1613, the control channel 1615, and the data channel 1617 may be time division multiplexed in one symbol. FIG. 16B is a view illustrating a method for multiplexing different channels in one symbol. It can be seen that, when a reference signal 1621, a control signal 1623 and a data signal 1625 are all sequentially and consecutively mapped to the virtual resources in an FFT size 1619 before the DFT preprocessor and transmitted, three types of different channels 1631, 1633 and 1635 may be multiplexed and transmitted in one symbol 1629, and thus transmission delay is reduced.

Figure 17:
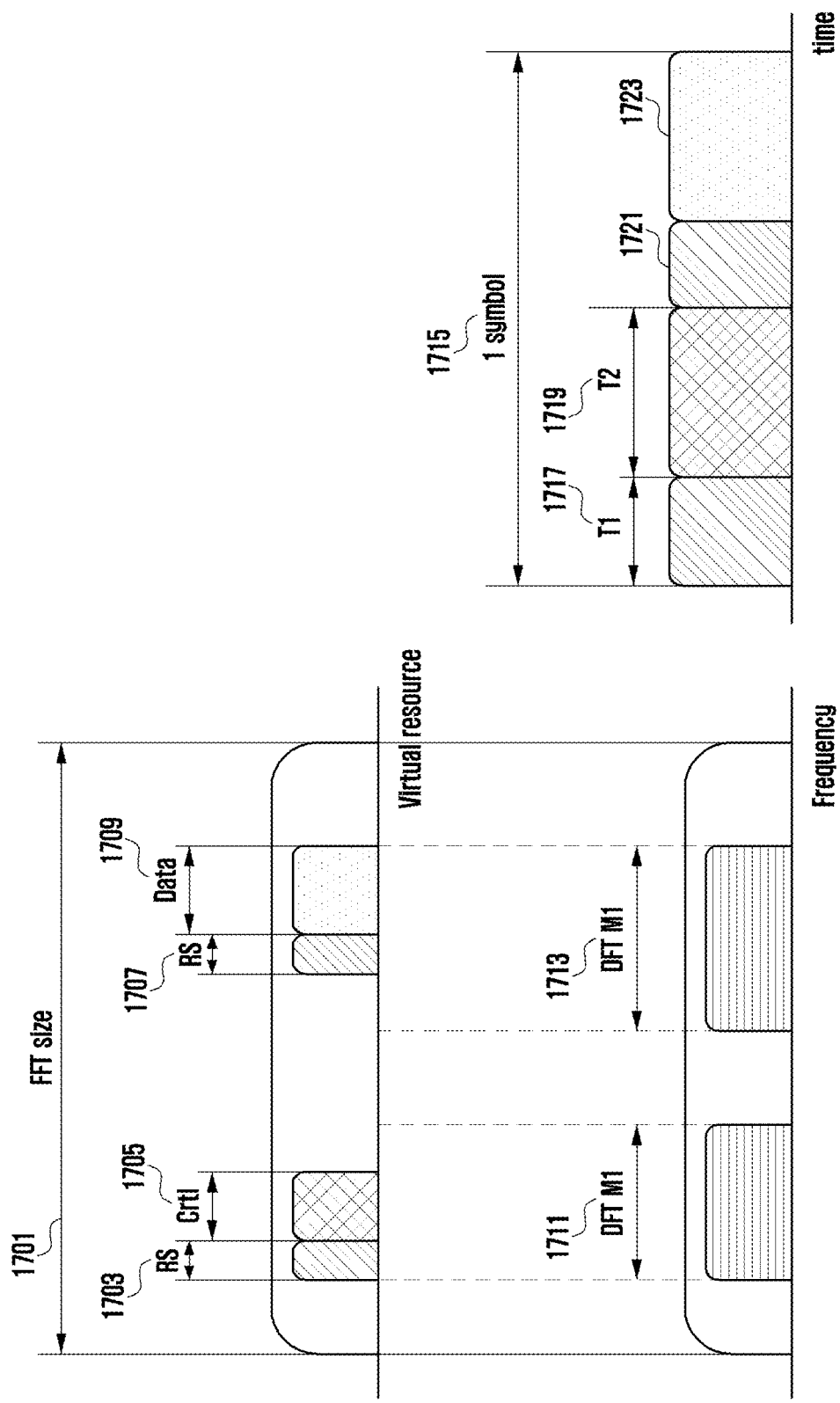
FIG. 17 is a view illustrating a packet structure for a case in which a control channel and a data channel occupy different bands in multi-band single carrier transmission proposed by the disclosure.

FIG. 17 is a view illustrating a packet structure for a case in which a control channel and a data channel occupy different bands in multi-band single carrier transmission proposed by the disclosure. Referring to FIG. 17, the proposed embodiment is a method for, in an FFT size 1701, when a reference signal 1703 for a control channel, the control channel 1705, a reference signal 1707 for a data channel and the data channel 1709 are transmitted in different bands, configuring a single carrier including the channels. To this end, a reference signal 1717 for a control channel, the control channel 1719, a reference signal 1721 for a data channel, and the data channel 1723 may be allocated to orthogonal sample areas in a symbol 1715 that do not overlap each other via DFTs such as 1711 and 1713.

Figure 18:
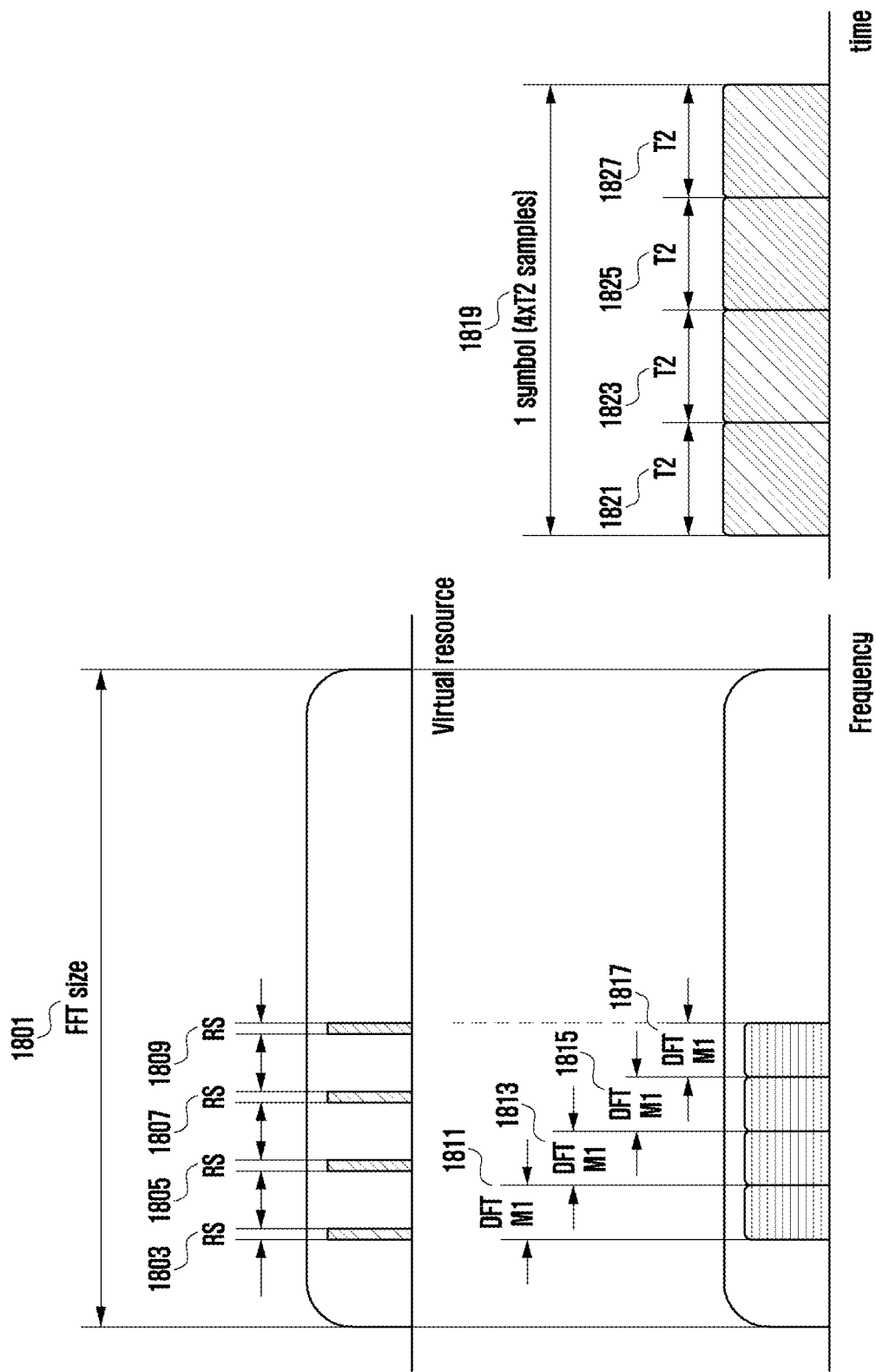
FIG. 18 is a view illustrating a method for transmitting one or more beams to one symbol in multi-band single carrier transmission proposed by the disclosure.

FIG. 18 is a view illustrating a method for transmitting one or more beams to one symbol in multi-band single carrier transmission proposed by the disclosure. Referring to FIG. 18, a method of allowing a beam to occupy different transmission bandwidths in transmitting a signal using one or more beans in one symbol is illustrated. Reference numeral 1801 denotes a channel bandwidth operated by a cell accessed by a terminal, which may be understood as an area occupied by the FFT used by the terminal. At this time, a transmitter may transmit so that N different beams occupy different frequency bands but are time multiplexed in one symbol by applying DFT such as 1811, 1813, 1815 and 1817 in transmitting 1803, 1805, 1807 and 1809, which are reference signals (hereinafter, may be mixed with beams) to which N different beams are applied.

In FIG. 18, it is illustrated that bandwidths occupied by each beam are the same, a single carrier bandwidth for each beam is continuous, the same size of each single carrier bandwidth, and each beam is sequentially transmitted within a time symbol. However, the content of the disclosure can be equally applied when the occupied bandwidth of each beam is different, the occupied bandwidth of each beam is not periodic, the single carrier bandwidth is discontinuous, or the non-sequential transmission of each beam. A base station may transmit information such as the number of transmission beams, the size of the bandwidth occupied by each beam, transmission order, etc. to a terminal via higher signaling, and the base station may configure a plurality of combinations in advance by combining one or more information and transmit the same to the terminal (by higher signaling). When the terminal is allocated a plurality of configurations, the terminal may receive indication from the base station one of the plurality of configurations via the control information transmitted on the control channel such as a PDCCH.

The reference signals to which the above-described beams are applied are sequentially transmitted as occupying time samples such as 1821, 1823, 1825 and 1827 from the viewpoint of one symbol as in 1819. In FIG. 18, reference signals occupying different bands are allocated to 1803, 1805, 1807 and 1809 to occupy different quarter time samples in each band and are transmitted without overlapping each other. If the base station transmits a transmission beam differently for each reference signal, the base station should configure so that each reference signal occupied a shorter time than ¼ in consideration of the switching time between beams. If the terminal searches for a reception beam, each reference signal is transmitted to occupy more samples in order to increase the reception accuracy without considering the switching time between beams, as shown in FIG. 18. The combination of transmission beam and reception beam utilization can be implemented by using the above described method alternately with each other.

Figure 19:
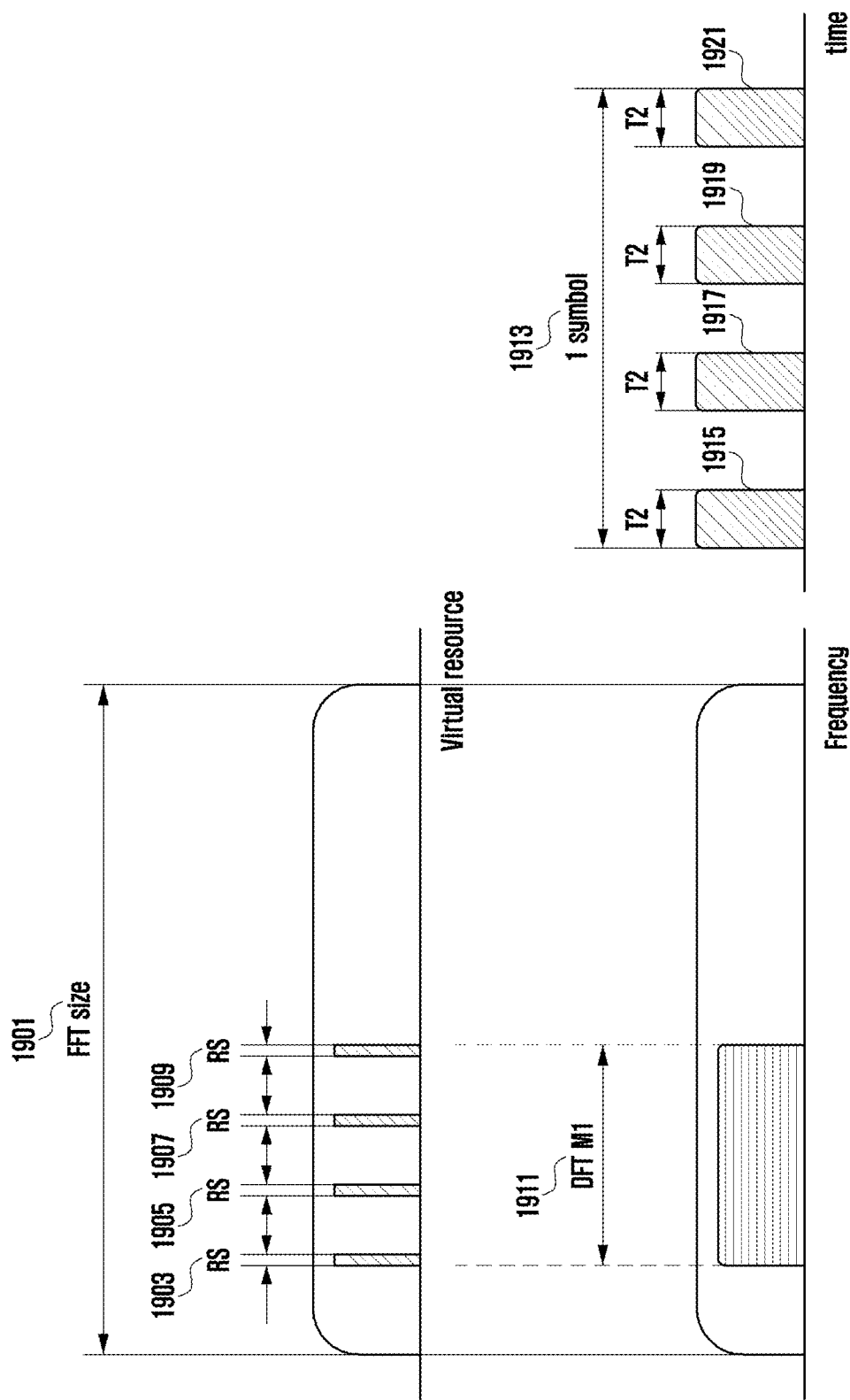
FIG. 19 is a view illustrating a method for performing beam detection by transmitting one or more beams to one symbol in multi-band single carrier transmission proposed by the disclosure.

FIG. 19 is a view illustrating a method for performing beam detection by transmitting one or more beams in multi-band single carrier transmission proposed by the disclosure. Referring to FIG. 19, reference numeral 1901 illustrates a channel bandwidth operated by a cell accessed by a terminal, which may be understood as an area occupied by an FFT used by the terminal. The proposed embodiment transmits N different reference signals in one symbol in the same single carrier band 1911 and applies different analog beams to each reference signal. The terminal may select one of the best beams based on the reference signal having the highest reception power among the reference signals transmitted by the base station by receiving one symbol and separating the received time samples in time. According to the embodiment, since the base station can use one or more beams in one symbol, beam transmission and beam search time can be reduced. Reference numerals 1903, 1905, 1907, and 1909 are examples when the number N of reference signals is four. Here, it can be seen that each reference signal is allocated to a virtual resource at regular intervals from each other, taking into account the time margin at which the transmitter switches the beam. If faster beam change is possible, the time interval may be shortened or more beams may be transmitted. In the case of beam retrieval, it is more important to measure the beam reception power than the channel estimation. Therefore, it is more important to know how many beams can be transmitted in a short time than the channel estimation performance of the transmission signal. Therefore, according to the proposed method, the base station can transmit several beams to the terminal very quickly in one symbol and the terminal can quickly search for the optimal beam.

Since the reference signals of 1903, 1905, 1907 and 1909 are transmitted in the same one single carrier band 1911, they all occupy the same frequency band. In order to transmit each reference signal in a different bands, the base station can transmit each reference signal in a different band in consideration of the occupancy time of each reference signal, as shown in FIG. 18. From the perspective of one time symbol 1913, it can be seen that four reference signals, such as 1915, 1917, 1919 and 1921 are transmitted occupying different sample times, and the transmitter can change the beam during the interval between 1915 and 1917. On the contrary, the base station may transmit the reference signals using the same beam at 1903, 1905, 1907 and 1909, and the terminal can change the weight of the reception beam to perform the reception beam search while receiving 1915, 1917, 1919, and 1921. As described above, the method proposed by the disclosure can also be used for receiving beam search, and can also be used for a combination of transmission and reception beam searches. The configuration information for the beam search may be transmitted to the terminal via higher signaling, or may be transmitted to the terminal via control information transmitted via a control channel such as PDCCH and signaling information such as MAC CE. The configuration information may include at least one of reference signal configuration information including time and/or frequency resources, the number of transmission beams, the size of the bandwidth of each reference signal to which the transmission beams are applied, the occupancy time of the beams, and the transmission order of the beams.

FIG. 20A is a view illustrating a single carrier frequency band configuration method proposed by the disclosure. Referring to FIG. 20A, the single carrier frequency band may be configured regardless of a resource allocation area to which a terminal is scheduled and this embodiment includes a method of instructing the terminal of an offset of the bandwidth in order for the terminal to recognize the single carrier frequency band configuration. Reference numeral 2001 illustrates a channel bandwidth operated by a cell accessed by a terminal, which may be understood as an FFT area used by the terminal. In this case, the terminal is allocated a separated BWP according to its performance, and in order for the base station to transmit a single carrier signal, the base station should configure a single carrier frequency band in consideration of resource allocation information of data actually transmitted in the BWP or BWP of the terminal.

In the case of NR, the resource allocation method may be configured as a virtual resource unit occupying 12 sub-carrier areas, and this unit is called a resource block (RB). Accordingly, the terminal receives resource allocation in multiples of 12 sub-carrier areas. The BWP may be indicated and configured by six consecutive RBs. In this case, the frequency band of the single carrier used by the terminal may be configured to be larger than a multiple of 12, and an error generated at this time may be configured to be smaller than 12 sub-carriers (that is, may be configured to 11 sub-carriers or less). This error configuration may be included in the BWP configuration information or PDSCH configuration information via higher signaling and transmitted to the terminal. In addition, this error configuration may be dynamically transmitted to the terminal via PDCCH. This error configuration may also be the starting point of resource allocation with a low frequency index and the error of a single carrier frequency band, the end point of the resource allocation with a high frequency index and the error of a single carrier frequency band. The error configuration may be delivered to the terminal in a manner of transmitting information indicating whether the error is part of the error, whether the single carrier frequency band coincides with or does not coincide with the frequency resource allocation band.

According to FIG. 20A, A 2000 corresponds to a case in which a BWP 2005 and a single carrier frequency band 2003 coincide. In this case, the resource allocation area and the single carrier frequency band coincide. In contrast, B 2100 corresponds to a case in which a BWP 2011 and a single carrier frequency band 2009 do not coincide. Reference numeral 2013 is the error of frequency bands occupied by the BWP 2011 and the single carrier frequency band 2009. In this case, the resource allocation area and the single carrier frequency band also do not coincide.

FIG. 20B is a view illustrating another single carrier frequency band configuration method proposed by the disclosure. According to FIG. 20B, both C 2020 and D 2030 do not coincide in BWP and single carrier frequency bands. In the case of C 2020, the resource allocation band and the single carrier frequency band coincide with each other (2019). In the case of D 2030, an error 2027 occurs between a resource allocation band and a frequency band occupied by a single carrier 2025. In FIGS. 20A and 20B, the error of the starting point having a low frequency index is illustrated, but the same may be applied to the method for supporting the above-described various errors.

Figure 21:
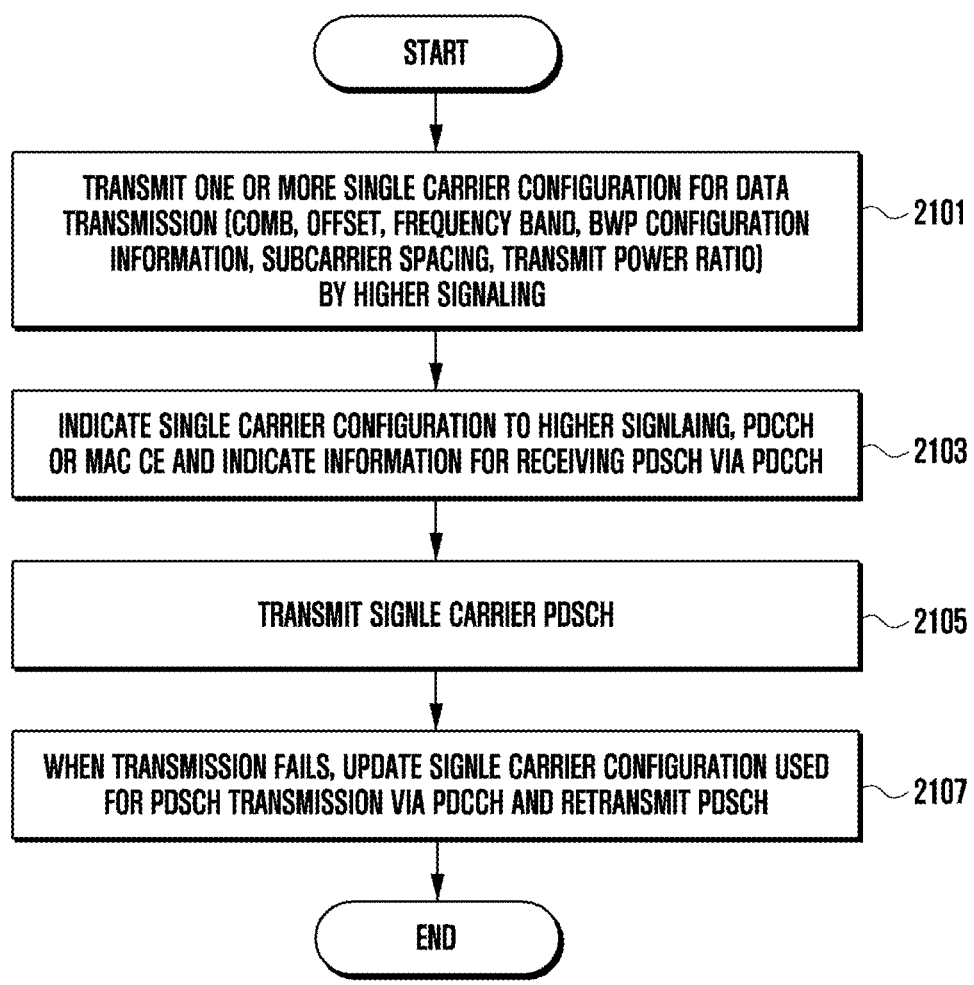
FIG. 21 is a view illustrating an example of an operation of a base station for carrying out the disclosure.

FIG. 21 is a view illustrating an example of an operation of a base station for carrying out the disclosure.

Referring to FIG. 21, in operation 2101, the base station transmits one or more configurations for single carrier transmission (for example, at least one of configuration information described in the disclosure, such as comb, offset, location and/or size of a BWP frequency band, sub-carrier spacing, location and/or size of a single carrier band, difference between a BWP frequency band and a single carrier band (offset), transmission power ratio, configuration information for beam detection, etc.) to a terminal via higher signaling. In operation 2103, the base station indicates single carrier transmission configuration used for data transmission to the terminal via higher signaling, PDCCH or MAC CE, and indicates control information (resource allocation information or downlink control information) used for PDSCH receiving to the terminal via PDCCH. At this time, the single carrier transmission configuration indication indicated by the base station in operation 2103 may be information indicating one of one or more pieces of configuration information configured in operation 2101. In addition, the process of indicating a single carrier transmission configuration in operation 2103 may be omitted. In this case, only one single carrier transmission configuration information may be transmitted in operation 2101.

In operation 2105, the base station transmits a PDSCH to the terminal using a single carrier. Then, in operation 2107, the base station updates and transmits control information for PDSCH reception using a single carrier used for retransmission, based on the transmission success or failure of the PDSCH reported by the terminal, and transmits the PDSCH based on this.

In addition, the base station may operate as follows. An example of a method of transmitting a plurality of terminals in different frequency bands using a single carrier is as follows. The base station may determine a preferred frequency band for each user, determine the ratio of samples occupied by one terminal to a plurality of terminals, determine a location occupied by one symbol of a data channel transmitted to a plurality of terminals, and determine the power of a sample occupied by one terminal by a plurality of terminals. In addition, the base station may determine a single carrier occupied bandwidth, based on the allowable bandwidth of the terminal, and may configure one or more single carrier occupied bandwidth, based on the allowable bandwidth of the terminal and indicate this to one or more terminals.

In addition, in order to occupy orthogonal time in transmitting a single carrier signal for terminals occupying different frequency bands connected to one base station, the base station may interleave resources available to each terminal or interleave resources to which a signal for each terminal may be transmitted in order to reduce interference when transmitting a single carrier signal to a terminal occupying the same frequency band in one or more base stations.

In addition, when terminals occupying overlapping frequency bands in one or more base stations perform communication using different sub-carrier intervals, the base station may exchange information with the terminal and/or the neighboring base station to transmit a signal without interference. In addition, the base station may multiplex one or more supported reference signals into one symbol to maintain a single carrier, and include at least a reference signal, a control signal and a data signal in one symbol to reduce transmission delay. In addition, the base station may configure one or more single carrier bands corresponding to one symbol so as to transmit one or more beams (the applied reference signal), and do not overlap the symbols.

Figure 22:
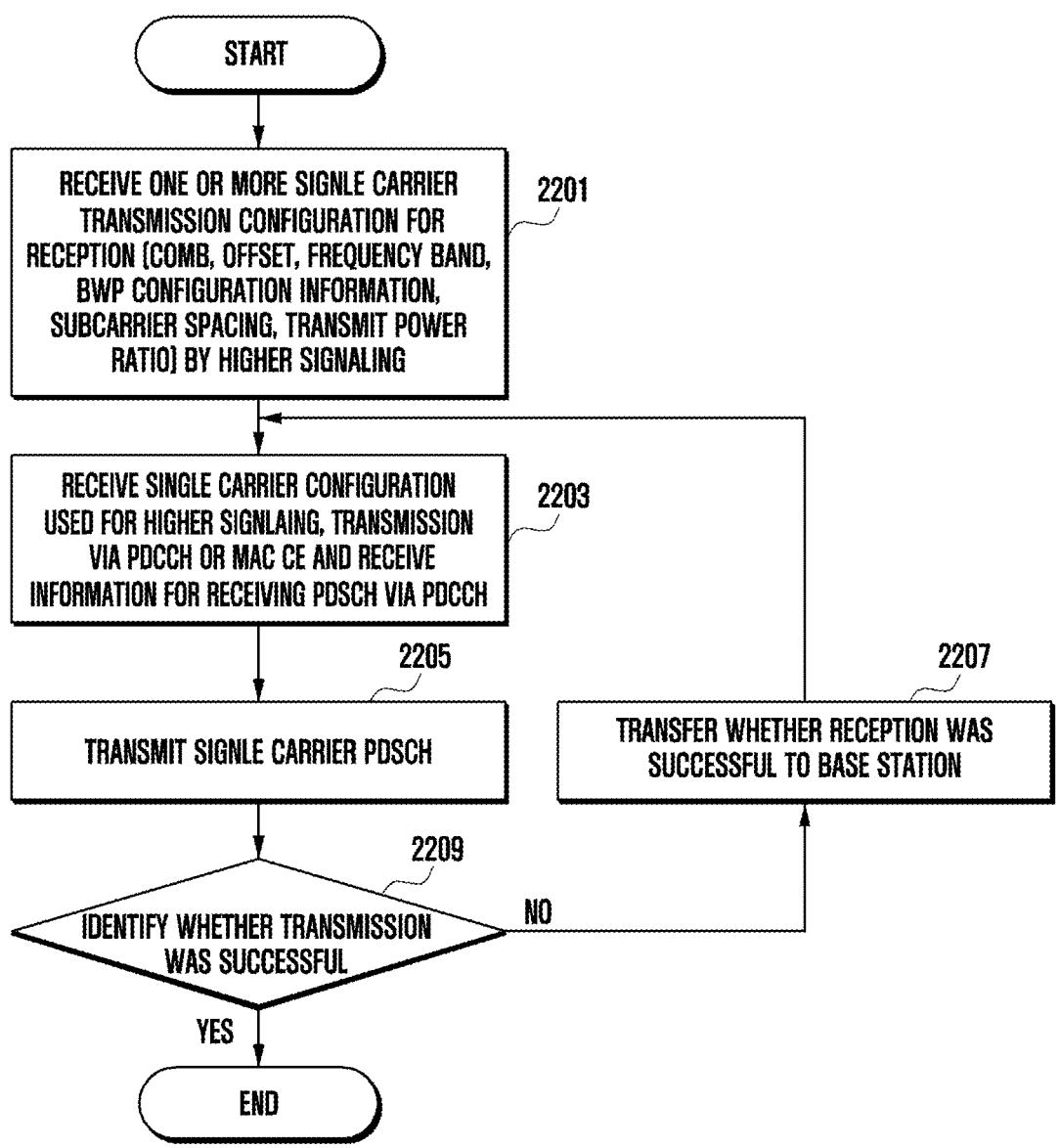
FIG. 22 is a view illustrating an example of an operation of a terminal for carrying out the disclosure.

FIG. 22 is a view illustrating an example of an operation of a terminal for carrying out the disclosure.

According to FIG. 22, first, in operation 2201, the terminal receives one or more single carrier transmission configurations for data reception form a base station via higher signaling. The single carrier transmission configuration may be configuration information transmitted in operation 2101 of FIG. 21. In operation 2203, the terminal receives a single carrier configuration indication used for data transmission via higher signaling, PDCCH or MAC CE, identifies a single carrier configuration, and receives information for PDSCH reception via the PDCCH.

Then, in operation 2205, the terminal receives and demodulates the PDSCH transmitted on single carrier. In operation 2209, the terminal determines whether the received PDSCH had been successfully received, and if the reception fails, in operation 2207, the terminal transmits information indicating whether reception is successful via the uplink to the base station. In operation 2203, new configuration information may be received for subsequent PDSCH transmission or retransmission, a PDCCH for scheduling retransmission may be received, and the PDSCH may be received in operation 2205.

Figure 23:
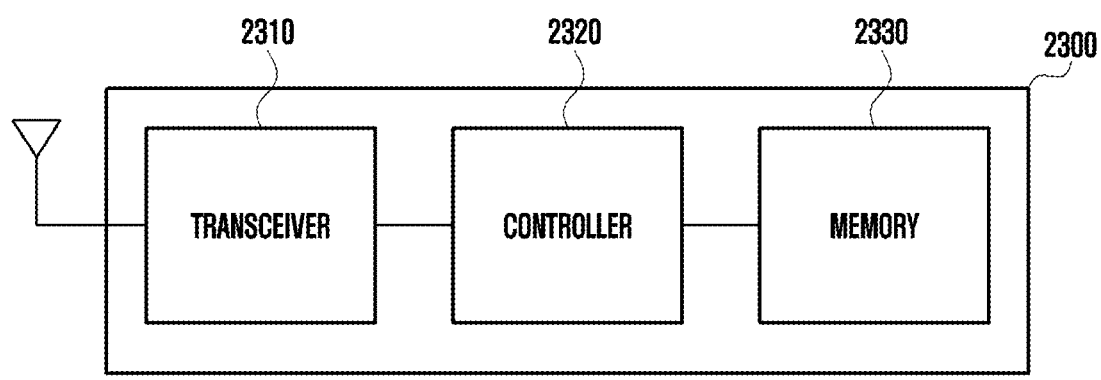
FIG. 23 is a view illustrating a base station device capable of carrying out the disclosure.

FIG. 23 is a view illustrating a base station device capable of carrying out the disclosure. The base station device 2300 includes a transceiver 2310, a controller 2320 and a storage unit 2330, and the transceiver 2310 may transmit and receive a signal with a terminal. The signal may include control information, a reference signal, and data. To this end, the transceiver 2310 may include an RF transmitter for up-converting and amplifying a frequency of a transmitted signal, and an RF receiver for low noise amplifying and down-converting a received signal. In addition, the transceiver 2310 may receive a signal through a wireless channel, output the signal to the controller 2320, and transmit a signal output from the controller 2320 through the wireless channel. The controller 2320 may control a series of processes to operate the base station according to the above-described embodiment of the disclosure.

Figure 24:
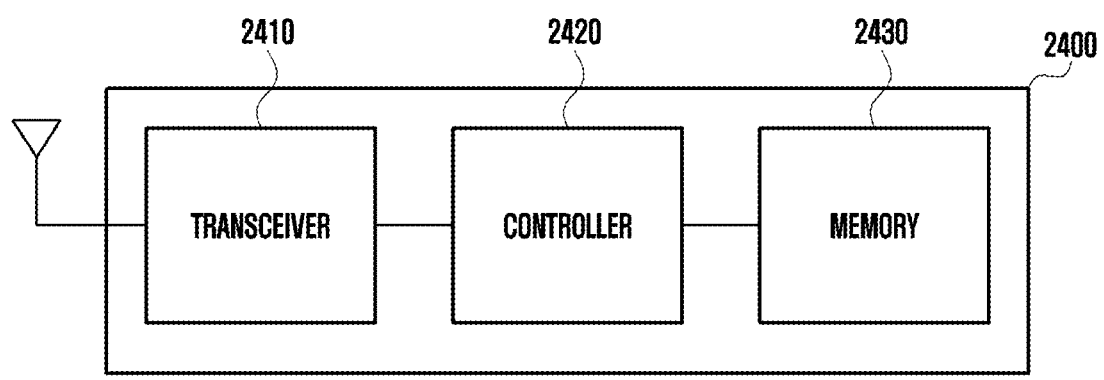
FIG. 24 is a view illustrating a terminal device capable of carrying out the disclosure.

FIG. 24 is a view illustrating a terminal device capable of carrying out the disclosure. The terminal device 2400 includes a transceiver 2410, a controller 2420 and a storage unit 2430, and the transceiver 2410 may transmit and receive a signal with a base station. The signal may include control information, a reference signal, and data. To this end, the transceiver 2410 may include an RF transmitter for up-converting and amplifying a frequency of a transmitted signal, and an RF receiver for low noise amplifying and down-converting a received signal. In addition, the transceiver may receive a signal through a wireless channel, output the signal to the controller 2420, and transmit a signal output from the controller 2420 through the wireless channel. The controller 2420 may control a series of processes to operate the terminal according to the above-described embodiment of the disclosure.

According to the embodiments of the disclosure, a base station can effectively transmit a signal to a plurality of terminals through a single carrier, and also improve system performance by transmitting signals through a preferred frequency band for each terminal. In addition, according to the embodiments of the disclosure, the base station may maintain coverage by transmitting a single carrier signal to each terminal in a frequency band preferred by one or more terminals using the same analog beam. In addition, according to the embodiments of the disclosure, the base station may preset or adjust the time domain of a sample occupied by one terminal in one symbol, and may transmit a signal so that the samples of each terminal do not overlap in the time domain between the terminals. In addition, according to an embodiment of the disclosure, the base station may support single carrier transmission regardless of the maximum allowable frequency band of the terminal and the size of the frequency domain of the data channel actually transmitted.

In addition, according to an embodiment of the disclosure, the base station may preset one or more candidates for a single carrier transmission bandwidth in the terminal and perform data scheduling so that the base station can change the dynamic or reactively. In addition, according to an embodiment of the disclosure, the base station may adjust the power density transmitted to the terminal in consideration of a frequency band allocated by the terminal or a sample occupancy time in a symbol regardless of the frequency band. In addition, according to an embodiment of the disclosure, the base station may allow samples for data channels transmitted to one or more terminals so as to be distributed in symbols, but not to overlap with samples for data channels of other terminals.

In addition, according to an embodiment of the disclosure, when one or more base stations transmit signals simultaneously by occupying the same frequency band, the interference may be randomized such that only some of the overlapping samples (on the time axis) exist between the terminals scheduled by the respective base stations. In addition, according to an embodiment of the disclosure, when one or more base stations using different sub-carrier intervals transmit signals by occupying the same frequency band, the base stations may transmit signals without interference. In addition, according to an embodiment of the disclosure, the base station may use the offset of the virtual resource index differently in the frequency band used by each terminal to transmit the reference signal for supporting one or more terminals occupying different frequency bands so that interference does not occur.

In addition, according to an embodiment of the disclosure, the base station may perform reference signal transmission for supporting one or more terminals occupying different frequency bands. In addition, according to an embodiment of the disclosure, the base station may multiplex and transmit at least one of a reference signal, a control channel, and a data channel to one symbol for one or more terminals occupying different frequency bands. In addition, one base station according to an embodiment of the disclosure may transmit signals using different samples in one or more bands using different analog beams in one symbol.

The embodiments disclosed in the specification and drawings are merely illustrative of specific examples in order to facilitate description and understanding of the technical contents, and are not intended to limit the scope of the disclosure. It is apparent to those skilled in the art that other modified examples based on the technical idea of the disclosure can be implemented as well as the embodiments disclosed herein.

Although various embodiments of the disclosure have been shown and described in this specification and the drawings, they are used in general sense in order to easily explain technical contents of the disclosure, and to help comprehension of the disclosure, and are not intended to limit the scope of the disclosure. It is apparent to those skilled in the art that other modified examples based on the technical idea of the disclosure can be implemented as well as the embodiments disclosed herein.

What is claimed is:

1. A method performed by a base station of a wireless communication system, the method comprising:
   identifying configuration information for a single carrier signal transmission;
   transmitting the single carrier signal transmission configuration information to a terminal;
   transmitting control information scheduling a data transmission; and
   transmitting data to the terminal using a single carrier corresponding to the single carrier signal transmission configuration information and the control information,
   wherein the single carrier signal transmission configuration information includes resource allocation information for the terminal, the resource allocation information includes at least one of an offset for a discrete Fourier transform (DFT) precoding or frequency comb information, frequency resource information of a bandwidth part, or sub-carrier spacing information.

2. The method of claim 1, further comprising:
   transmitting information indicating one of plurality of configuration information sets included in the single carrier signal transmission configuration information,
   wherein the information is transmitted via higher signaling or a medium access control (MAC) control element.

3. The method of claim 1, wherein:
   the single carrier signal transmission configuration information includes power ratio information applied to the terminal,
   the data transmitted to the terminal is transmitted in a portion of one time symbol, and
   a transmission power of the data is based on the power ratio information.

4. The method of claim 1, further comprising:
   transmitting a plurality of reference signals to which a beam is applied to the terminal,
   wherein:
   the single carrier signal transmission configuration information includes beam related configuration information, and
   the plurality of reference signals are transmitted in one time symbol.

5. The method of claim 1, wherein:
   the transmitting the data to the terminal using single carrier comprises:
   identifying a resource allocated for transmitting the data to the terminal,
   performing a single carrier preprocessing on the data to be transmitted to the terminal, and
   allocating the data of a single carrier waveform to the identified resource, and
   wherein the data is transmitted in a portion of one time symbol.

6. The method of claim 1, wherein the control information and the data are transmitted in one time symbol.

7. The method of claim 1, wherein the frequency comb information includes at least one of a comb spacing or a comb offset.

8. A method performed by a terminal of a wireless communication system, the method comprising:
   receiving configuration information for a single carrier signal transmission from a base station;
   receiving control information scheduling a data transmission; and
   receiving data from the base station using a single carrier according to the single carrier signal transmission configuration information and the control information,
   wherein the single carrier signal transmission configuration information includes resource allocation information for the terminal, the resource allocation information includes at least one of an offset for a discrete Fourier transform (DFT) precoding or frequency comb information, frequency resource information of a bandwidth part, or sub-carrier spacing information.

9. The method of claim 8, further comprising:
receiving information indicating one of plurality of configuration information sets included in the single carrier signal transmission configuration information,
wherein the information is received via higher signaling or a medium access control (MAC) control element.

10. The method of claim 8, wherein:
the single carrier signal transmission configuration information includes power ratio information applied to the terminal,
the data received by the terminal is received in a portion of one time symbol, and
a transmission power of the data is based on the power ratio information.

11. The method of claim 8, further comprising:
receiving a plurality of reference signals to which a beam is applied to the base station,
wherein:
the single carrier signal transmission configuration information includes beam related configuration information, and
the plurality of reference signals are received in one time symbol.

12. The method of claim 8, wherein the received data is received in a portion of one time symbol.

13. The method of claim 8, wherein the control information and the data are received in one time symbol.

14. The method of claim 8, wherein the frequency comb information includes at least one of a comb spacing or a comb offset.

15. A base station of a wireless communication system, the base station comprising:
a transceiver; and
a controller coupled with the transceiver and configured to:
identify configuration information for a single carrier signal transmission,
transmit the single carrier signal transmission configuration information to a terminal,
transmit control information scheduling a data transmission, and
transmit data to the terminal using a single carrier corresponding to the single carrier signal transmission configuration information and the control information,
wherein the single carrier signal transmission configuration information includes resource allocation information for the terminal, the resource allocation information includes at least one of an offset for a discrete Fourier transform (DFT) precoding or frequency comb information, frequency resource information of a bandwidth part, or sub-carrier spacing information.

16. The base station of claim 15, wherein:
the controller is further configured to transmit information indicating one of plurality of configuration information sets included in the single carrier signal transmission configuration information, and
the information is transmitted via higher signaling or a medium access control (MAC) control element.

17. The base station of claim 15, wherein:
the single carrier signal transmission configuration information includes power ratio information applied to the terminal,
the data transmitted to the terminal is transmitted in a portion of one time symbol, and
a transmission power of the data is based on the power ratio information.

18. The base station of claim 15, wherein:
the controller is further configured to transmit a plurality of reference signals to which a beam is applied to the terminal,
the single carrier signal transmission configuration information includes beam related configuration information, and
the plurality of reference signals are transmitted in one time symbol.

19. The base station of claim 15, wherein:
the controller is further configured to:
identify a resource allocated for transmitting the data to the terminal,
perform a single carrier preprocessing on the data to be transmitted to the terminal, and
allocate the data of a single carrier waveform to the identified resource, and
the data is transmitted in a portion of one time symbol.

20. The base station of claim 15, wherein the control information and the data are transmitted in one time symbol.

21. The base station of claim 15, wherein the frequency comb information includes at least one of a comb spacing or a comb offset.

22. A terminal of a wireless communication system, the terminal comprising:
a transceiver; and
a controller coupled with the transceiver and configured to:
to receive configuration information for a single carrier signal transmission from a base station,
to receive control information scheduling data transmission, and
to receive data from the base station using a single carrier according to the single carrier signal transmission configuration information and the control information,
wherein the single carrier signal transmission configuration information includes resource allocation information for the terminal, the resource allocation information includes at least one of an offset for a discrete Fourier transform (DFT) precoding or frequency comb information, frequency resource information of a bandwidth part, or sub-carrier spacing information.

23. The terminal of claim 22, wherein:
the controller is configured to receive information indicating one of plurality of configuration information sets included in the single carrier signal transmission configuration information, wherein the information is received via higher signaling or a medium access control (MAC) control element.

24. The terminal of claim 22, wherein:
the single carrier signal transmission configuration information includes power ratio information applied to the terminal,
the data received by the terminal is received in a portion of one time symbol, and
a transmission power of the data is based on the power ratio information.

25. The terminal of claim 22, wherein:
the controller is configured to receive a plurality of reference signals to which a beam is applied to the base station,
the single carrier signal transmission configuration information includes beam related configuration information, and
the plurality of reference signals are received in one time symbol.

26. The terminal of claim 22, wherein the received data is received in a portion of one time symbol.

27. The terminal of claim 22, wherein the control information and the data are received in one time symbol.

28. The terminal of claim 22, wherein the frequency comb information includes at least one of a comb spacing or a comb offset.

* * * * *